US009769037B2

(12) United States Patent
Hindawi et al.

(10) Patent No.: US 9,769,037 B2
(45) Date of Patent: Sep. 19, 2017

(54) FAST DETECTION AND REMEDIATION OF UNMANAGED ASSETS

(71) Applicant: Tanium Inc., Berkeley, CA (US)

(72) Inventors: David Hindawi, Berkeley, CA (US);
Orion Hindawi, Berkeley, CA (US);
Lisa Lippincott, Berkeley, CA (US);
Peter Lincroft, Albany, CA (US)

(73) Assignee: TANIUM INC., Emeryville, CA (US)

( * ) Notice: Subject to any disclaimer, the term of this patent is extended or adjusted under 35 U.S.C. 154(b) by 381 days.

(21) Appl. No.: 14/553,769

(22) Filed: Nov. 25, 2014

(65) Prior Publication Data

US 2015/0149624 A1 May 28, 2015

Related U.S. Application Data

(60) Provisional application No. 61/909,866, filed on Nov. 27, 2013.

(51) Int. Cl.
*G06F 15/173* (2006.01)
*H04L 12/26* (2006.01)
(Continued)

(52) U.S. Cl.
CPC ........ *H04L 43/065* (2013.01); *H04L 41/0853* (2013.01); *H04L 41/0866* (2013.01); *H04L 41/12* (2013.01); *H04L 63/1433* (2013.01)

(58) Field of Classification Search
CPC . H04L 41/0853; H04L 41/12; H04L 41/0866; H04L 41/0854; H04L 43/065
(Continued)

(56) References Cited

U.S. PATENT DOCUMENTS 6,049,828 A 4/2000 Dev et al.
6,879,979 B2 4/2005 Hindawi et al.
(Continued)

FOREIGN PATENT DOCUMENTS

EP 1553747 A1 7/2005
EP 2493118 A1 8/2012

OTHER PUBLICATIONS

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.
(Continued)

*Primary Examiner* — Kyung H Shin
(74) *Attorney, Agent, or Firm* — Morgan, Lewis & Bockius LLP

(57) ABSTRACT

In one aspect, methods, system, and computer-readable media for monitoring unmanaged assets in a network having a plurality of managed machines include: at a first managed machine of the plurality of managed machines, wherein the plurality of managed machine are arranged in a linear communication orbit and have respective identifiers, and each managed machine is coupled to at least one respective neighbor by a corresponding local segment of the linear communication orbit: responding to a detection instruction for detecting unmanaged assets currently present in the network, by: scanning for live unmanaged machines within a selected portion of the network that is associated with a range of identifiers that includes identifiers between the respective identifiers of the first managed machine and a respective neighbor of the first managed machine; and generating a local report identifying one or more unmanaged machines that have been detected within the selected portion of the network.

30 Claims, 17 Drawing Sheets

(51) Int. Cl.
*H04L 12/24* (2006.01)
*H04L 29/06* (2006.01)

(58) Field of Classification Search
USPC .................................................. 709/223, 224
See application file for complete search history.

(56) References Cited

U.S. PATENT DOCUMENTS

| | | |
|---|---|---|
| 7,299,047 B2 | 11/2007 | Dolan et al. |
| 7,555,545 B2 | 6/2009 | McCasland |
| 7,600,018 B2 | 10/2009 | Maekawa et al. |
| 7,698,453 B2 | 4/2010 | Samuels et al. |
| 7,720,641 B2 | 5/2010 | Alagappan et al. |
| 7,761,557 B2 | 7/2010 | Fellenstein et al. |
| 7,844,687 B1 | 11/2010 | Gelvin et al. |
| 8,078,668 B2 | 12/2011 | Moreau |
| 8,185,612 B1 | 5/2012 | Arolovitch et al. |
| 8,185,615 B1 | 5/2012 | McDysan et al. |
| 8,271,522 B2 | 9/2012 | Mehul et al. |
| 8,392,530 B1 | 3/2013 | Manapragada et al. |
| 8,477,660 B2 | 7/2013 | Lee et al. |
| 8,504,879 B2 | 8/2013 | Poletto et al. |
| 8,510,562 B2 | 8/2013 | Ramakrishnan et al. |
| 8,885,521 B2 | 11/2014 | Wang et al. |
| 2001/0056461 A1 | 12/2001 | Kampe et al. |
| 2002/0007404 A1 | 1/2002 | Vange et al. |
| 2002/0042693 A1 | 4/2002 | Kampe et al. |
| 2002/0073086 A1 | 6/2002 | Thompson et al. |
| 2003/0101253 A1 | 5/2003 | Saito et al. |
| 2003/0131044 A1 | 7/2003 | Nagendra et al. |
| 2003/0212676 A1 | 11/2003 | Bruce et al. |
| 2004/0076164 A1 | 4/2004 | Vanderveen et al. |
| 2004/0190085 A1 | 9/2004 | Silverbrook et al. |
| 2005/0108356 A1 | 5/2005 | Rosu et al. |
| 2005/0108389 A1 | 5/2005 | Kempin et al. |
| 2006/0039371 A1 | 2/2006 | Castro et al. |
| 2007/0005738 A1* | 1/2007 | Alexion-Tiernan H04L 41/0853 709/223 |
| 2007/0211651 A1 | 9/2007 | Ahmed et al. |
| 2008/0082628 A1 | 4/2008 | Rowstron et al. |
| 2008/0133582 A1 | 6/2008 | Andersch et al. |
| 2008/0263031 A1 | 10/2008 | George et al. |
| 2008/0288646 A1 | 11/2008 | Hasha et al. |
| 2009/0125639 A1 | 5/2009 | Dam et al. |
| 2009/0319503 A1 | 12/2009 | Mehul et al. |
| 2010/0085948 A1 | 4/2010 | Yu et al. |
| 2010/0306252 A1 | 12/2010 | Jarvis et al. |
| 2011/0271319 A1 | 11/2011 | Venable, Sr. |
| 2013/0170336 A1 | 7/2013 | Chen et al. |
| 2013/0276053 A1 | 10/2013 | Hugard, IV et al. |
| 2014/0149557 A1 | 5/2014 | Lohmar et al. |
| 2014/0164552 A1 | 6/2014 | Kim et al. |
| 2014/0181295 A1 | 6/2014 | Hindawi et al. |
| 2014/0244727 A1 | 8/2014 | Kang et al. |

OTHER PUBLICATIONS

Rao et al., "Optimal Resource Placement in Structured Peer-to-Peer Networks," Jul. 2010, IEEE Transactions on Parallel and Distributed Systems, vol. 21, No. 7, 16 pgs.
Tanium Inc, International Preliminary Report on Patentability, PCT/US2014/067607, May 31, 2016, 10 pgs.
Hood, Proactive Network-Fault Detection, Sep. 1997, 9 pages.
Stoica, I., et al., "Chord: A Scalable Peer-to-Peer Lookup Service for Internet Applications," SIGCOMM '01, Aug. 27-31, 2001, San Diego, California, 12 pages.
Tanium Inc, International Search Report and Written Opinion, PCT/US2013/076971, Apr. 4, 2014, 19 pgs.
Tanium Inc, International Preliminary Report on Patentability, PCT/US2013/076971, Jun. 23, 2015, 14 pgs.
Tanium Inc, International Search Report and Written Opinion, PCT/US2015/0020780, Jul. 2, 2015, 14 pgs.
Weixiong Rao et al, "Optimal Resource Placement in Structured Peer-to-Peer Networks," IEEE Transactions on Parallel and Distributed Systems, vol. 21, No. 7, Jul. 2010, 16 pgs.
Tanium Inc, International Preliminary Report on Patentability, PCT/US2015/0020780, Sep. 27, 2016, 9 pgs.
Tanium Inc, International Search Report and Written Opinion, PCT/US2014/067607, Feb. 18, 2015, 15 pgs.

* cited by examiner

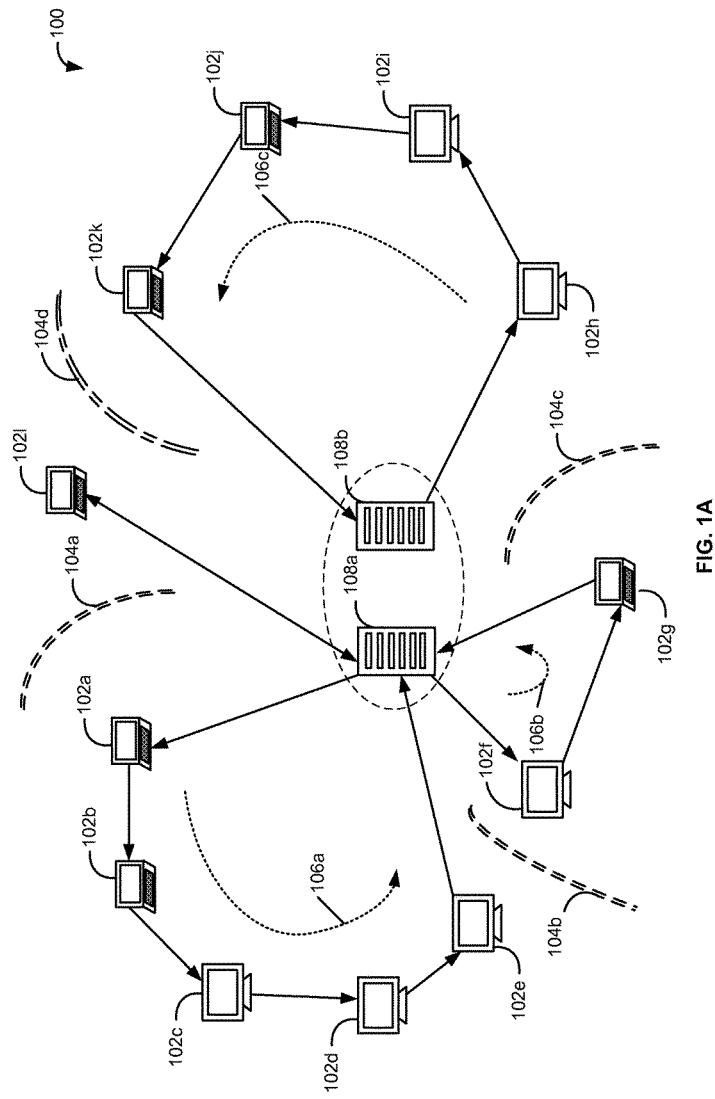

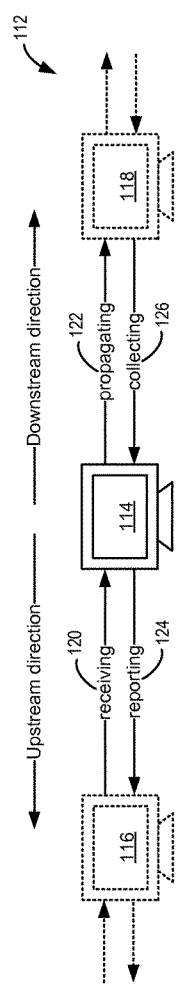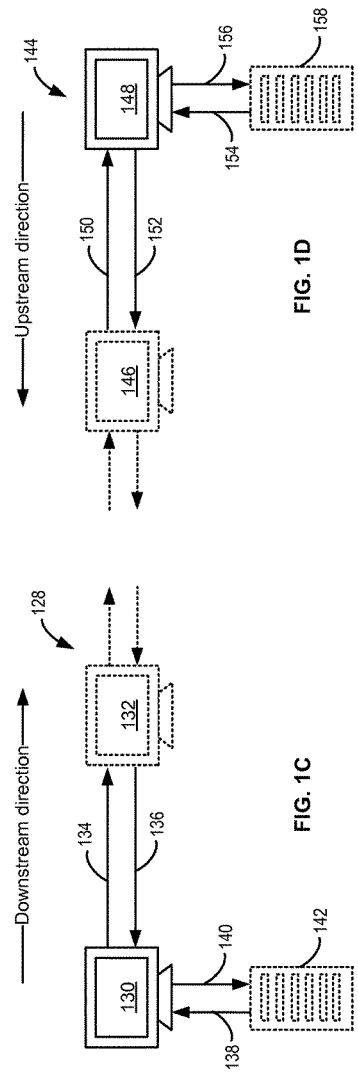
FIG. 1B
FIG. 1C
FIG. 1D

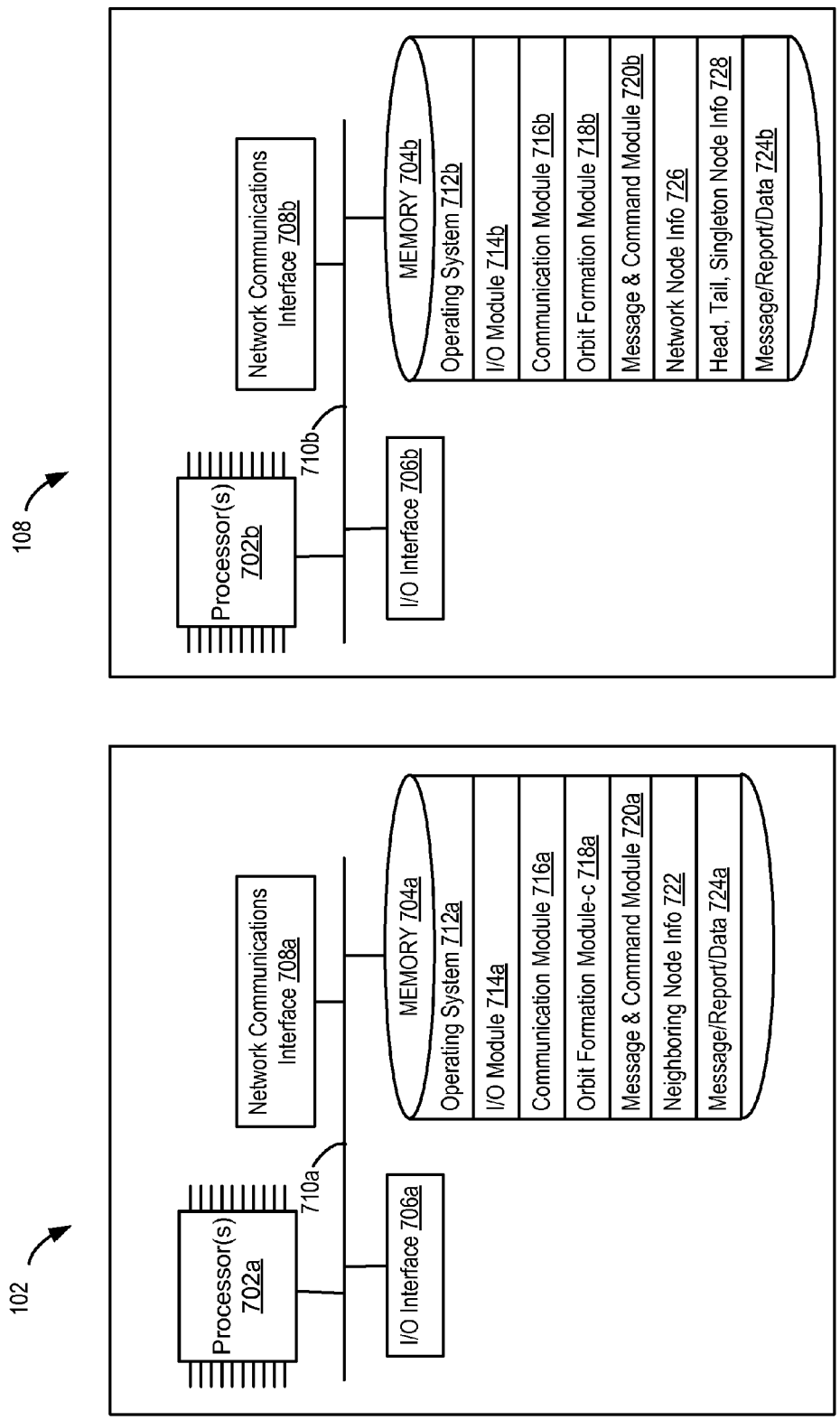

FAST DETECTION AND REMEDIATION OF UNMANAGED ASSETS

RELATED APPLICATIONS

This application claims priority to U.S. Provisional Application No. 61/909,866, filed Nov. 27, 2013, which is hereby incorporated by reference in its entirety.

This application relates to U.S. patent application Ser. No. 12/412,623, filed Mar. 27, 2009, now U.S. Pat. No. 8,086,729, entitled "Distributed Statistical Detection of Network Problems and Causes"; U.S. patent application Ser. No. 13/084,923, filed Apr. 12, 2011, entitled "Large-Scale Network Querying and Reporting"; U.S. patent application Ser. No. 13/107,625, filed May 13, 2011, entitled "Parallel Distributed Network Management"; U.S. patent application Ser. No. 13/301,250, filed Nov. 21, 2011, entitled "Distributed Statistical Detection of Network Problems and Causes"; and U.S. patent application Ser. No. 13/797,962, filed Mar. 12, 2013, entitled "Creation and Maintenance of Self-Organizing Communication Orbits in Distributed Networks." Content of each of the above applications is incorporated herein by reference in its entirety.

BACKGROUND

A managed network (e.g., an enterprise network) often includes a large number of machines and devices configured to perform a wide variety of functions. System, security, and resource management on a network, such as collecting real-time information regarding systems and resources in the network and dynamically modifying and reallocating resources and data in the network, requires a substantial amount of computation and communication resources. An important aspect of system, security, and resource management on a network involves monitoring entry of unmanaged machines into the network, and taking prompt and appropriate actions to control and mitigate the security and economic risks associated with such entry. Managed machines are devices on the network that are subject to complete monitoring and control from a central management server, for instance by having the correct management software installed, which would enable them to communicate with and respond to actions propagated from a central management server.

Effective control of unmanaged machines present in the network involve actions on multiple levels, including fast detection of unmanaged machines in the network, obtaining information about the unmanaged machines, remedying any security vulnerabilities introduced by these unmanaged machines, and establishing subsequent management of the unmanaged machines, for example. As an unmanaged machine can enter and exit a network within a very short amount of time, and potentially cause significant damage (e.g., infecting other machines with malware, and causing data loss and/or security breach, etc.) to the network within such a short amount of time, fast detection and remediation of unmanaged assets in the network is critical to the security and integrity of the network's operations.

In a conventional centrally-managed network, a central management server is responsible for issuing requests (e.g., requests for status updates, detection of unmanaged machines, system management operations, security management operations, and network management operations, etc.) to targeted destination nodes in the network. These requests often take a long time (e.g., hours to days) to propagate through the network to the appropriate destination nodes. These latencies make real-time detection of unmanaged machines and subsequent control of these machines difficult, since it frequently takes more time to collect information about the statuses of machines coupled to the network than it takes for those statuses to change and/or for damage to occur as a result of a security breach through the unmanaged machines.

Some conventional networks attempt to ameliorate the problems of a centralized management scheme by performing some degree of aggregation or processing of data at intermediate control levels (e.g., one or more intermediate servers), resulting in a hierarchical management structure between the network administrator and the end nodes. These centralized management schemes do not scale well. For example, for a network with 100,000 nodes, it may take several hours or more to report the statuses of individual nodes, or even of an aggregate thereof. In that timeframe, the status reports may have become obsolete before arriving at the central management server, compromising the effectiveness of the management actions taken according to the status reports. In addition, these hierarchical management structures themselves are difficult and complex to create and maintain, and are prone to problems and failures.

SUMMARY

In one aspect, in some embodiments, a machine becomes a managed machine in a managed network by implementing a predetermined set of common rules that are also implemented by other managed machines in the network. Individual actions taken by the managed machines according to the predetermined set of common rules collectively cause these managed machines to self-organize into one or more linear communication orbits without active global control and/or coordination by a central server or an administrator. Each machine that is coupled to the network (e.g., having an assigned IP address in the network), but is not part of the one or more linear communication orbits, is an unmanaged asset in the network. In some embodiments, machines or assets referred to in this specification include not only computers, but also other types of devices coupled to the network, such as networked printers, mobile devices, tablets, communication devices, etc., that have been assigned respective IP addresses in the network. When a request for detecting unmanaged assets is issued by a requestor (e.g., a server or an administrator), the detection request is propagated from one machine to the next along the one or more linear communication orbits. In response to receiving the detection request, each managed machine within a respective linear communication orbit takes on the responsibility of scanning its immediate neighborhood (e.g., nearby IP addresses) to detect any live unmanaged assets that may be present in the respective local portion of the network spanning the immediate neighborhood of the managed machine (e.g., all the IP addresses between itself and its next peer in the linear orbit). If a machine is a singleton, i.e., it forms a linear segment of a single node, the singleton scans its local subnet (e.g., up to 255 local IP addresses). In some embodiments, each managed machine creates a local status report regarding its respective local scan, and adds the local status report to a global report that is propagated from a requestor, through the managed machines along a respective linear communication orbit, and back to the requester (e.g., a server issuing the detection request). In general, each managed machine can perform the local scan and the propagation of the detection request and the global status report with a minimal amount of time and resources. Thus, the unmanaged assets in the network can be detected in a matter of seconds rather than tens of minutes, hours, or even days. Similarly, instructions for remedial actions can also be speedily propagated to the unmanaged assets and/or to a security quarantine server through the linear communication orbits.

More specifically, in some embodiments, a method of monitoring unmanaged assets in a network having a plurality of managed machines, includes: at a first managed machine of the plurality of managed machines, wherein the plurality of managed machine are arranged in a linear communication orbit and have respective identifiers, and each managed machine is coupled to at least one respective neighbor by a corresponding local segment of the linear communication orbit: responding to a detection instruction for detecting unmanaged assets currently present in the network, by: scanning for live unmanaged machines within a selected portion of the network that is associated with a range of identifiers that includes identifiers between the respective identifiers of the first managed machine and a respective neighbor of the first managed machine; and generating a local report identifying one or more unmanaged machines that have been detected within the selected portion of the network.

Various embodiments may provide one or more of the following advantages:

In some embodiments, unmanaged machines can be detected and status information thereof can be collected in substantially real-time. Assuming a network of 100,000 nodes, an inquiry response time can be in the order of seconds (e.g., 15 seconds) rather than hours or days in the case of conventional detection schemes.

In some embodiments, only a small number of connections need to be maintained to establish the linear communication orbit(s). For example, in a network of 100,000 nodes, according to conventional detection techniques, a single management query may involve opening at least 200,000 connections –100,000 for the query to be sent from the server to every node, and 100,000 for the answers to be sent back to the server. In contrast, in some embodiments of the present invention, only about 200 connections may be needed –100 for the detection request to be sent from the server to the head node on each contiguous linear communication orbit, and 100 for the answers to be sent back from the tail node on each linear communication orbit.

Other embodiments and advantages are apparent to those skilled in the art in light of the descriptions and drawings in this specification.

BRIEF DESCRIPTION OF THE DRAWINGS

FIG. 1A illustrates a communication topology for performing fast detection of unmanaged assets in a managed network in accordance with some embodiments.

FIGS. 1B-1D illustrate respective local segments of an exemplary linear communication orbit for performing fast detection of unmanaged assets in a managed network in accordance with some embodiments.

FIG. 7A illustrates an exemplary managed machine that participates in the fast detection and subsequent control of unmanaged machines in a network in accordance with some embodiments.

FIG. 7B illustrates an exemplary server that participates in the fast detection and subsequent control of unmanaged assets in a network in accordance with some embodiments.

Like reference numerals refer to corresponding parts throughout the drawings.

DESCRIPTION OF EMBODIMENTS

Figure 1E:
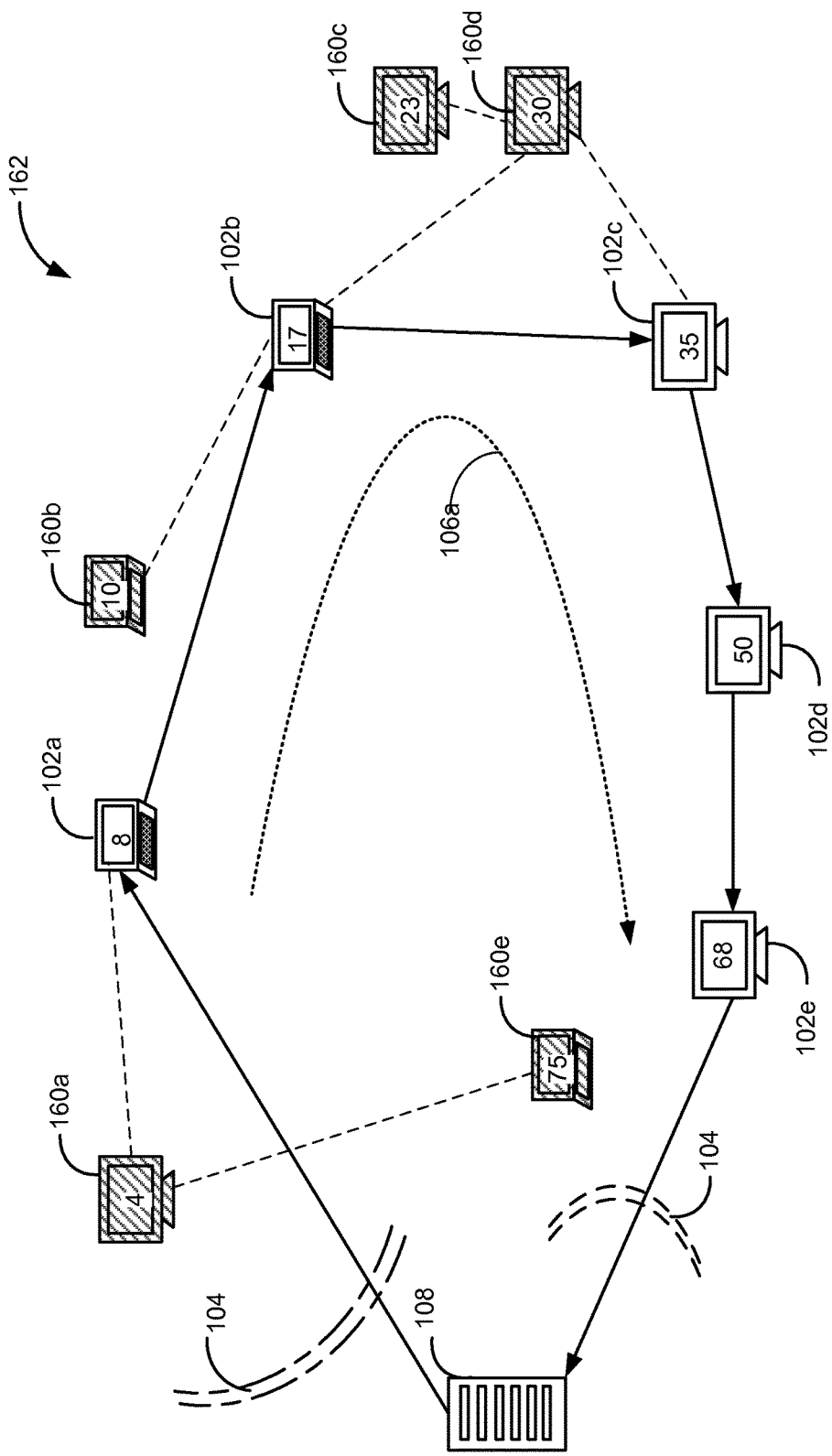
FIG. 1E illustrates presence of a plurality of unmanaged machines in a managed network having a plurality of managed machines forming a linear communication orbit in accordance with some embodiments.

FIG. 1A illustrates a managed network 100 comprising a plurality of interconnected machines 102 (e.g., machines 102a-l), e.g., computers, mobile devices, and other networked devices. Examples of managed network 100 include an enterprise network or another network under common management. In some embodiments, at least some of machines 102 coupled to managed network 100 are distributed across different geographical areas and/or localized at the same physical location.

In some embodiments, machines 102 coupled to managed network 100 are divided into several sub-networks separated by one or more firewalls 104 (e.g., firewalls 104a-d). In some embodiments, machines 102 currently coupled to network 100 are self-organized into one or more linear communication orbits 106 (e.g., linear communication orbits 106a-c), each orbit connecting the machines within a respective sub-network enclosed by a respective firewall. In a special scenario, a linear communication orbit may include only a single managed machine (e.g., singleton 102l), e.g., when the managed machine is the only managed machine within the sub-network.

In some embodiments, managed network 100 also includes one or more servers 108 (e.g., servers 108a and 108b) that facilitate the creation and maintenance of the one or more linear communication orbits 106. In some embodiments, the server itself can be one of the managed nodes in the linear communication orbits 106. In some embodiments, each linear communication orbit 106 (e.g., linear communication orbit 106a) includes one head node (e.g., head node 102a), one tail node (e.g., tail node 102d), and a sequence of zero or more intermediate client nodes (e.g., intermediate nodes 102c and 102d) in between the head node (e.g., head node 102a) and the tail node (e.g., tail node 102e). In some embodiments, the head node (e.g., head node 102a) and tail node (e.g., tail node 102e) of each linear communication orbit 106 (e.g., 106a) are connected to server 108 (e.g., server 108a), as shown in FIG. 1A. In some embodiments, only the head node of each linear communication orbit 106 is connected to server 108, while the intermediate nodes and tail nodes are not connected to server 108, but are connected to their respective neighbor nodes in the linear communication orbit. In some embodiments, when a node is not connected to any adjacent node, that node remains as a singleton (e.g., singleton 102l) connected to server 108 (e.g., server 108a). In some embodiments, a singleton directly connected to server 108 is considered as a linear communication orbit having only one node. In general, only a single linear communication orbit is formed and maintained by all managed machines within a sub-network (e.g., within a firewall, or within a predetermined range of IP addresses).

In some embodiments, an important feature of linear communication orbit 106 is that it is automatically formed without global, continuous, and/or active intervention by any network administrative program or personnel. Each managed machine 102 joining network 100 is equipped with (or provided with) a set of predetermined rules, e.g., through installation and execution of predetermined management software. According to the set of predetermined rules, each managed machine 102 finds its neighboring managed machines in the network and coordinates with these neighboring managed machines to self-organize into a local segment of the linear communication orbit. The local segments of adjacent managed machines overlap and fuse into a contiguous segment of the linear communication orbit. In some embodiments, each managed machine is assigned a respective unique identifier (e.g., an IP address) in the sub-network, and all of the managed machines within the sub-network are arranged into (e.g., as dictated by the predetermined set of rules) the linear communication orbit in a sequential order determined based on a sequential order of the respective unique identifiers of the managed machines. Sometimes, a machine enters a network (e.g., be assigned an IP address within the firewall of a sub-network) as an unmanaged machine, and becomes a managed machine by acquiring and implementing the set of predetermined rules (e.g., by installing and executing the predetermined management software) and thereby inserts itself into an existing linear communication orbit in accordance with the set of predetermined rules.

Although each managed machine 102 within managed network 100 is optionally configured to communicate with another machine within or outside of managed network 100 through various connection-oriented and/or connectionless protocols during their normal operations (e.g., user-level operations, such as emailing, Internet browsing, VoIP, database accessing, etc.), the ad hoc connections established for these normal operations are not the focus of the present discussion and are not shown in FIG. 1A. Instead, the present specification focuses on communication orbits that are established and maintained to facilitate fast detection and subsequent administration and control of unmanaged assets detected in the network, among other system, security, and network management tasks. In particular, propagation of detection requests, detection of unmanaged assets, collection of status information (e.g., machine type, operating system type and version, IP address, software version, security status, time and content of last update, etc.) of the unmanaged assets in the managed network, and issuance of system, security and/or network management commands (e.g., commands related to quarantine, removal, deployment of management software, etc.) for individual managed and unmanaged machines on the managed network, are accomplished through the linear communication orbits.

In some embodiments, as shown in FIG. 1A, each linear communication orbit 106 links all of the managed machines coupled to a sub-network (e.g., a LAN defined by a respective firewall) in a unidirectional communication orbit, where the unidirectional communication orbit includes a respective unidirectional communication channel between each pair of adjacent managed machines in an ordered sequence of all managed machines 102 in the sub-network. In some embodiments, the linear communication orbit is a bidirectional communication orbit, where the bidirectional communication orbit includes a respective pair of communication channels (one for each direction) between each pair of adjacent managed machines in an ordered sequence of all managed machines 102 in the sub-network. In some embodiments, a unidirectional communication orbit is used for propagating status inquiries (e.g., detection requests for unmanaged assets), status reports (e.g., local and aggregated reports of detected unmanaged assets), and management commands (e.g., reporting instructions, software distribution, and remedial instructions) to all managed machines 102 in the sub-network. In some embodiments, a bidirectional communication orbit is used for those purposes.

In some embodiments, a single dedicated server 108 (e.g., server 108a or 108b) is provided for the respective linear communication orbit (e.g., linear communication orbits 106a or 106c) of each sub-network. In some embodiments, a respective server is elected automatically from among all or a subset of managed machines 102 according to various predetermined election rules implemented on the managed machines 102. In some embodiments, no server is needed to facilitate the formation and maintenance of the linear communication orbit(s) in network 100, as long as the managed machines 102 have other ways of obtaining their respective ordinal positions (or a respective list of their potential neighbors) in the sequence of all managed machines 102 currently coupled to sub-network. For example, in some embodiments, each machine 102 stores a static list of its potential neighbors rather than relying on a server to provide such a list, provided that only a substantially fixed set of machines can be coupled to the network.

FIGS. 1B-1D illustrate configurations of various local segments of a linear communication orbit in accordance with some embodiments. FIG. 1B illustrates a local segment (e.g., local segment 112) that is centered about an intermediate client node (e.g., intermediate node 114). FIG. 1C illustrates a local segment (e.g., local segment 128) of a linear communication orbit that includes a head node (e.g., head node 130) of the linear communication orbit. FIG. 1D illustrates a local segment (e.g., local segment 144) of a linear communication orbit that includes a tail node (e.g., tail node 148) of the linear communication orbit.

As shown in FIG. 1B, local segment 112 of the linear communication orbit includes intermediate node 114 and two immediately adjacent nodes, i.e., predecessor node 116 and successor node 118. Each node is implemented by a respective managed machine 102 coupled to network 100 in FIG. 1A. Although only a single local segment is shown in FIG. 1B, a person skilled in the art would recognize that each machine 102 other than a head node and a tail node in a linear communication orbit is the intermediate node of a respective local segment and has a respective predecessor node (also referred to as a respective upstream neighbor) and a respective successor node (also referred to as a respective downstream neighbor) in the linear communication orbit. In some embodiments, an intermediate node is persistently connected only to its respective predecessor and successor nodes, and not to the server or other nodes in the network, for sending and receiving communications related to detecting unmanaged assets and taking management control of the detected unmanaged assets.

In some embodiments, all managed machines 102 coupled to network 100 are sorted into an ordered sequence according to a respective unique identifier associated with each managed machine 102. For example, in some embodiments, respective IP addresses of managed machines 102 are used to sort the managed machines into an ordered sequence.

In some embodiments, the managed machines are sorted according to decreasing IP address values, an upstream direction of the linear communication orbit is the direction of increasing IP address values, and a downstream direction of the linear communication orbit is the direction of decreasing IP address values.

In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers are used, each type associated with a deterministic way of sorting the unique identifiers of that type into an ordered sequence. In some embodiments, each managed machine is provided with rules for determining the identifiers of its own upstream and/or downstream neighbors in the ordered sequence. In some embodiments, each managed machine is also provided with rules for determining a corresponding network address (e.g., IP address) for each identifier, if the identifier is not a network address.

As shown in FIG. 1B, in a local segment (e.g., local segment 112) of the linear communication orbit, each intermediate node central to the local segment, as represented by managed machine 114, optionally has a pair of communication channels linking said managed machine to each of its pair of adjacent managed neighbors, as represented by predecessor node 116 and successor node 118. The four communication channels of said managed machine include: (1) a receiving channel (e.g., receiving channel 120) for receiving information from a preceding neighbor (e.g., predecessor node 116), (2) a reporting channel (e.g., reporting channel 124) for providing information to the preceding neighbor, (3) a propagation channel (e.g., propagation channel 122) for sending information to a succeeding neighbor (e.g., successor node 118), and (4) a collection channel (e.g., collection channel 126) for receiving information from the succeeding neighbor. Although both forward and backward communication channels are shown between each pair of adjacent managed machines in FIG. 1B, in some embodiments, only forward communication channels (i.e., communication channels each leading from an upstream node to a downstream node) are established.

FIG. 1B shows a local segment of a linear communication orbit that is centered about an intermediate node (e.g., intermediate node 114). Each linear communication orbit also includes a head node and a tail node. FIG. 1C shows local segment 128 centered about a head node (e.g., head node 130). FIG. 1D shows local segment 144 centered about a tail node (e.g., tail node 148).

As shown in FIG. 1C, local segment 128 includes head node 130 and its successor node 132. In addition, head node 130 is connected to server 142 (e.g., also shown as server 108 in FIG. 1A) that serves as a pseudo-predecessor node for head node 130. Head node 130 has a pseudo-receiving channel (e.g., pseudo-receiving channel 138), a pseudo-reporting channel (e.g., pseudo-reporting channel 140), a propagation channel (e.g., propagation channel 134), and a collection channel (e.g., collection channel 136). Pseudo-receiving channel 138 of head node 130 is a forward communication channel established between server 142 and head node 130. Pseudo-reporting channel 140 of head node 130 is a backward communication channel established between server 142 and head node 130. In this specification, a forward communication channel between a server and a head node is a channel for sending information downstream from the server to the head node. A backward communication channel between the server and the head node is a channel for sending information upstream from the head node to the server. Propagation channel 134 of head node 130 is a forward communication channel established between head node 130 and its successor node 132. Collection channel 136 of head node 130 is a backward communication channel established between head node 130 and its successor node 132.

As shown in FIG. 1D, local segment 144 includes tail node 148 and its predecessor node 146. In addition, tail node 144 is connected to server 158 (e.g., also shown as server 108 in FIG. 1A) that serves as a pseudo-successor node for tail node 148. Tail node 148 has a pseudo-propagation channel (e.g., pseudo-propagation channel 156), a pseudo-collection channel (e.g., pseudo-collection channel 154), a receiving channel (e.g., receiving channel 150), and a reporting channel (e.g., reporting channel 152). Pseudo-propagation channel 156 of tail node 148 is a forward communication channel established between server 158 and tail node 148. Pseudo-collection channel 154 of tail node 148 is a backward communication channel established between server 158 and tail node 148. In this specification, a forward communication channel between a server and a tail node is a channel for sending information downstream from the tail node to the server. A backward communication channel between the server and the tail node is a channel for sending information upstream from the server to the tail node. Receiving channel 150 of tail node 148 is a forward communication channel established between tail node 148 and its predecessor node 146. Reporting channel 152 is a backward communication channel established between tail node 148 and its predecessor node 146.

Not shown in FIGS. 1B-1D is a singleton node that is connected only to the server, and has only a pair of communication channels, one for receiving information from the server, and the other for providing information to the server. In some embodiments, a singleton node performs the functions of both a head node and a tail node in the detection of unmanaged assets. For example, in some embodiments, a head node scans for unmanaged assets between itself and its downstream neighbor, a tail node scans for unmanaged assets between itself and the end of the subnet (e.g., up to an IP address ending with 0.255). A singleton scans for all the nodes in its subnet (e.g., up to 255 nodes).

In some embodiments, the server (e.g., server 108 of each sub-network) maintains a record of all managed machines currently known to be coupled to the managed network and their respective unique identifiers. The server also maintains a record of the ordinal positions of these managed machines in a sorted sequence according to their respective unique identifiers. In some embodiments, each server also maintains a record of a current head node and a current tail node for each linear communication orbit that is under its management. In some embodiments, if a server manages several linear communication orbits of several sub-networks (e.g., several sub-networks separated by firewalls), the server maintains a current list of head nodes, tail nodes, and singleton nodes that have opened forward and backward connections to the server, such that the server can determine the current topologies of the network and its constituent linear communication orbits.

As shown in FIGS. 1B-1D, each pair of adjacent managed machines in the linear communication orbit has a pair of communication channels established between them. This pair of communication channels provides full-duplex communications between the pair of adjacent managed machines. Each managed machine has the ability to simultaneously receive information from and provide information to its adjacent managed machines upstream and downstream in the linear communication orbit. In some embodiments, the communication channels are established using a connection-oriented communication protocol, such as TCP, SMTP, DCCP, connection-oriented Ethernet, ATM, IPS, SCTP, or any other suitable connection-oriented communication protocol. Although it is possible to use less reliable, connectionless protocols, such as UDP, to support communications between adjacent machines in the linear communication orbit, maintaining a stable communication channel based on a connection-oriented communication protocol is advantageous in some embodiments because such protocols are more reliable and require less error correction and processing time. In some embodiments, a connectionless protocol may be advantageous because it is more lightweight as compared to a connection-oriented protocol. In various embodiments, the communication channels may be or supported by both wired and wireless communication protocols and communication means. In addition, each managed machine only needs to maintain a small number of open connections (e.g., at most four open connections) at any given time. In most cases, this is not burdensome to the managed machines and eliminates latencies that could be introduced by reestablishing the connections for each individual communications.

FIGS. 1B-1D illustrate some basic building blocks of a linear communication orbit. Exemplary processes for autonomously establishing, maintaining, and repairing the linear communication orbit based on a set of predetermined rules, and without global control or manipulation are provided in U.S. application Ser. No. 13/797,962, filed Mar. 12, 2013, entitled "Creation and Maintenance of Self-Organizing Communication Orbits in Distributed Networks," the content of which is incorporated herein by reference.

FIG. 1E illustrates the presence of unmanaged assets 160 (e.g., unmanaged machines 160a-e) in network 100 (e.g., within sub-network 162 defined by a respective firewall 104 or a predetermined range of IP addresses (e.g., IP addresses from 192.163.1.1-192.163.1.100)). In general, an unmanaged machine can be coupled to a managed network and obtain an IP address within the managed network through any of a number of authorized or unauthorized means. For example, a contractor or consultant may be granted permission to connect an unmanaged computer or other network device from within an enterprise network in order to perform contracted work within the enterprise network. In another example, a new machine may be assigned an IP address within a local area network (LAN) through an initial setup process performed by an authorized technician, but may not have become a managed machine forming part of a linear communication orbit immediately. In addition, sometimes, an unmanaged machine may gain internal access to a managed network through a security vulnerability existing within the managed network. As a person skilled in the art would recognize, there are other authorized and unauthorized ways for a machine to enter a managed network and obtain a network address within the managed network, without first becoming a managed machine of the managed network or a sub-network thereof.

As shown in FIG. 1E, unmanaged machines 160 (e.g., 160a-106e) present in sub-network 162 may be coupled to one or more other managed machines (e.g., 102a-102c) in sub-network 162, or to one or more other unmanaged machines (e.g., 160a, 160c-e) in sub-network 162. In addition, as shown in FIG. 1E, managed machines 160 (e.g., 160a-160e) form a linear communication orbit in accordance with a sequential order of respective unique identifiers (e.g., IP addresses) associated with managed machines 160. In addition, each unmanaged machine 160 within sub-network 162 has been assigned a respective unique identifier (e.g., IP address) as well. Within the sub-network, an unmanaged machine (e.g., unmanaged machine 160a) may have a respective unique identifier (e.g., "4") that is within a range (e.g., "1-7") preceding the respective unique identifier (e.g., "8") of the head node (e.g., managed machine 102a) of the linear communication orbit (e.g., linear communication orbit 106a) in sub-network 162. In addition, within the sub-network, an unmanaged machine (e.g., unmanaged machine 160b) may have a respective unique identifier (e.g., "10") that is within a range (e.g., "9-17") preceding the respective unique identifier (e.g., "17") of an intermediate node (e.g., managed machine 102b) of the linear communication orbit in sub-network 162. In addition, within sub-network 162, an unmanaged machine (e.g., unmanaged machine 160c, or 160d) may have a respective unique identifier (e.g., "23" or "30") that is within a range (e.g., "18-34") between the respective unique identifier (e.g., "17") of an intermediate node (e.g., managed machine 102b) and the respective unique identifier (e.g., "35") of its successor node (e.g., managed machine 102c) in sub-network 162. Lastly, within sub-network 162, an unmanaged machine (e.g., unmanaged machine 160e) may have a respective unique identifier (e.g., "75") that is within a range (e.g., "69-100") following the respective unique identifier (e.g., "68") of the tail node (e.g., managed machine 102e) in sub-network 162. In some embodiments, the head node (e.g., managed machine 102a) maintains a record of the smallest possible unique identifier (e.g., "1" or "192.163.1.1") that can be assigned within its respective sub-network. In some embodiments, the tail node (e.g., managed machine 102e) maintains a record of the largest possible unique identifier (e.g., "100" or "192.163.1.100") that can be assigned within its respective sub-network.

As set forth herein, an important aspect of system, security, and resource management on a network involves monitoring entry of unmanaged machines into the network, and taking prompt and appropriate actions to control and mitigate the security and economic risks associated with such entry. Monitoring and controlling the entry of unmanaged machines into the network involve fast detection of unmanaged machines in the network, obtaining information about the unmanaged machines, remedying any security vulnerabilities introduced by these unmanaged machines, and establishing subsequent management of the unmanaged machines. As an unmanaged machine can enter and exit a network within a very short amount of time, and potentially cause significant damage (e.g., data loss, security breach, etc.) to the network within such a short amount of time, fast detection of unmanaged assets in the network is critical to the security and integrity of the network's operation. Exemplary embodiments of methods and systems for fast, real-time detection of unmanaged assets (e.g., results within seconds or minutes of detection request) are described with respect to the following illustrative examples and scenarios.

Figure 2A:
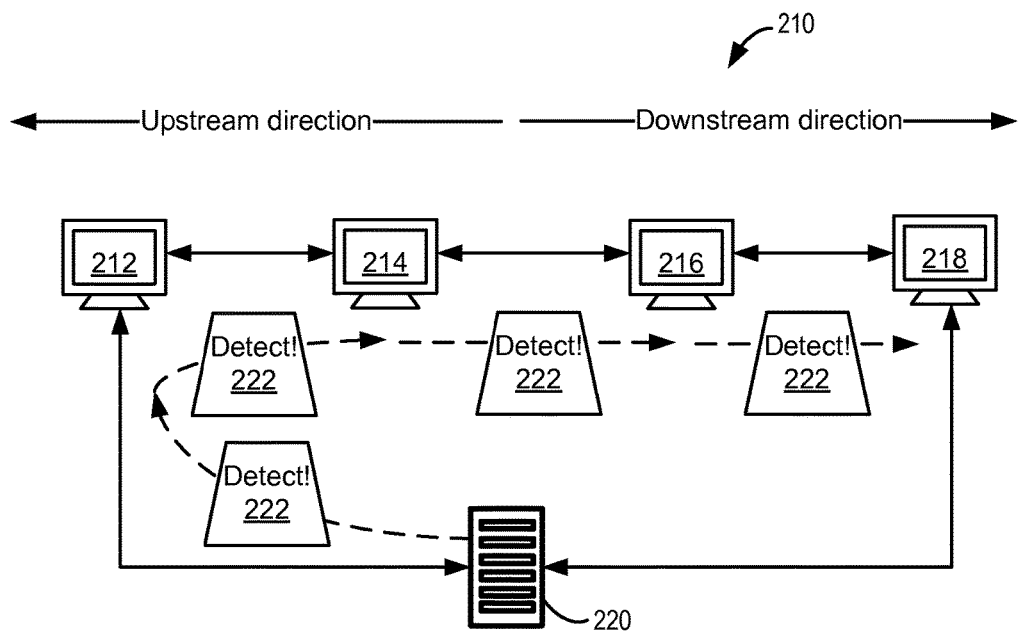
FIGS. 2A-2B each illustrate propagation of a detection request along a linear communication orbit in a managed network in accordance with some embodiments.
Figure 2B:
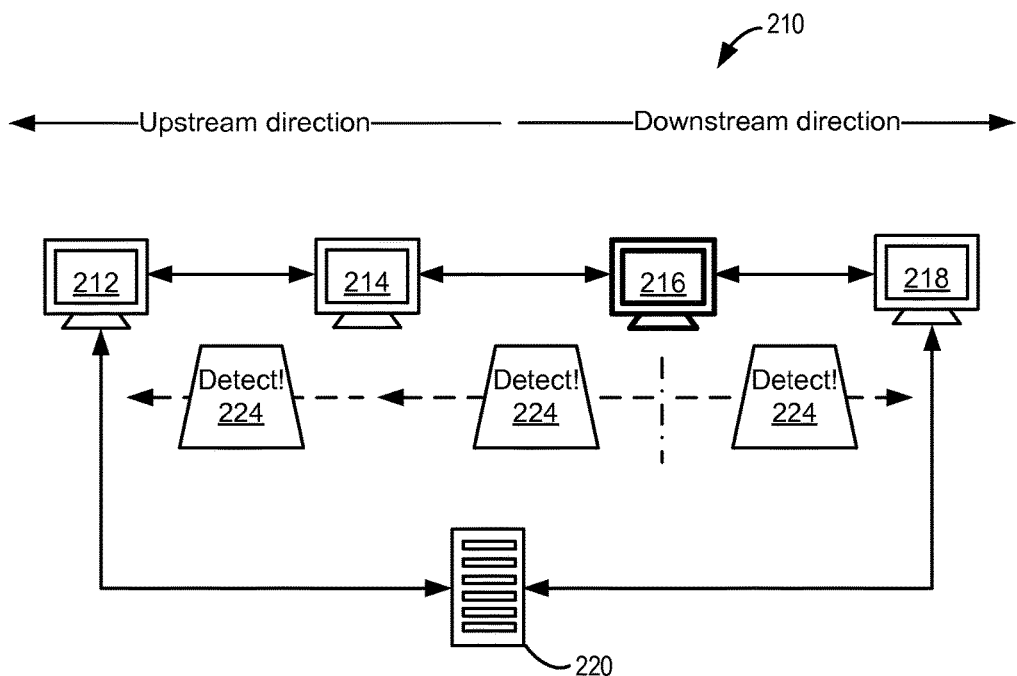

FIGS. 2A-2B each illustrate propagation of a detection request along a linear communication orbit in a managed network in accordance with some embodiments.

As shown in FIG. 2A, a linear communication orbit (e.g., linear communication orbit 210) is formed within a network (or sub-network) by a plurality of managed machines, including head node 212, two intermediate nodes 214, 216, and tail node 218. Head node 212 and tail node 218 are connected to server 220 of the network (or sub-network). The sequential order of the plurality of managed machines in linear communication orbit 210 is established based on a sequential order of the respective unique identifiers of the plurality of managed machines. A downstream direction of the linear communication orbit is a direction from server 220 to head node 212, and from head node 212 to tail node 218 through intermediate nodes 214 and 216. An upstream direction is a direction from server 220 to tail node 218, and from tail node 218 to head node 212 through intermediate nodes 216 and 214.

As shown in FIG. 2A, in some embodiments, a detection request (e.g., detection request 222) is issued by server 220 to head node 212. Detection request 222 includes a detection instruction for detecting unmanaged assets in the network. Detection request 222 is propagated from head node 212 to tail node 218 through intermediate nodes 214 and 216 along linear communication orbit 210 in the downstream direction. In some embodiments, the detection request is a simple instruction for each managed machine in the linear communication orbit to detect unmanaged assets present in its immediate neighborhood in the network. In some embodiments, the propagation of the detection request is accomplished through the forward communication channels (e.g., the receiving channel and the propagation channel) between each pair of adjacent managed machines in the linear communication orbit. In some embodiments, each managed machine forwards the received detection request to its respective downstream neighbor immediately after receiving the detection request from its respective upstream neighbor, without regard to whether the managed machine has started and/or completed the actual detection process in its respective local neighborhood.

As shown in FIG. 2A, tail node 218 is able to recognize that it does not have any succeeding neighbor other than server 220 along the linear communication orbit, and thus stops the further propagation of the detection request.

In some embodiments, each managed machine along the linear communication orbit does not modify the detection request before forwarding to the detection request to the next managed machine along the linear communication orbit.

In some embodiments, the server automatically generates and issues a respective detection request periodically (e.g., every hour, or every few minutes) or based on one or more predetermined trigger criteria (e.g., rise of unexplained network traffic, presence of suspicious communications within the network, etc.). In some embodiments, a human administrator optionally manually issues the detection request at any time through a management interface provided on a server terminal. In some embodiments, the detection request describes the parameters (e.g., IP address, operating system type, operating system version, device type, device version, software version, security status, etc.) that are to be included in a status report for the detection of unmanaged assets. In some embodiments, the detection request can be very lightweight and includes minimal information, and each managed machine automatically includes a standard set of parameters in the report for the detection of unmanaged assets performed in response to the detection request.

FIG. 2B shows an exemplary scenario in which a detection request (e.g., detection request 224) is not issued by a server (e.g., server 220) of the linear communication orbit (e.g., orbit 210). Instead, the detection request (e.g., detection request 224) is issued by a managed machine (e.g., intermediate node 216) within the linear communication orbit. As shown in FIG. 2B, in some embodiments, when detection request 224 is issued by intermediate node 216 within linear communication orbit 210, intermediate node 216 sends detection request 224 to both its predecessor node (e.g., node 214) and its successor node (e.g., node 218) along the linear communication orbit. Detection request 224 is then forwarded along the upstream direction and the downstream direction, respectively, until it reaches head node 212 and tail node 218, respectively. In general, when a node receives a detection request from its downstream neighbor, the node forwards the detection request onward in the upstream direction; and when a node receives a detection request from its upstream neighbor, it forwards the detection request onward in the downstream direction. In some embodiments, a head node will terminate further propagation of the detection request received from its downstream neighbor, and a tail node will terminate further propagation of the detection request received from its upstream neighbor.

In some embodiments, an intermediate machine (e.g., intermediate node 216) optionally generates a detection request (e.g., detection request 224) based on one or more predetermined trigger criteria. In some embodiments, the detection request is optionally generated by a human administrator from a management interface provided at the intermediate machine. In some embodiments, the same management interface is optionally provided on a single managed machine, or, alternatively, two or more managed machines within the linear communication orbit. When detection requests are generated from more than one managed machines, a respective serial number is optionally attached to the detection requests to indicate the identities of their respective requestors. In some embodiments, when detection requests are generated from more than one managed machine, respective propagations of the different detection requests are carried out independently of one another.

In some embodiments, if the head node (e.g., head node 212) in the linear communication orbit (e.g., linear communication orbit 210) generates a detection request, the head node sends the detection request in the downstream direction, and not in the upstream direction. Similarly, in some embodiments, if the tail node (e.g., tail node 218) in the linear communication orbit (e.g., linear communication orbit 210) generates a detection request, the tail node sends the detection request in the upstream direction, and not in the downstream direction.

FIGS. 3A-3D each illustrate respective local scans for unmanaged assets that are performed by managed machines in response to a detection request propagated along a linear communication orbit in a managed network in accordance with some embodiments.

Figure 3A:
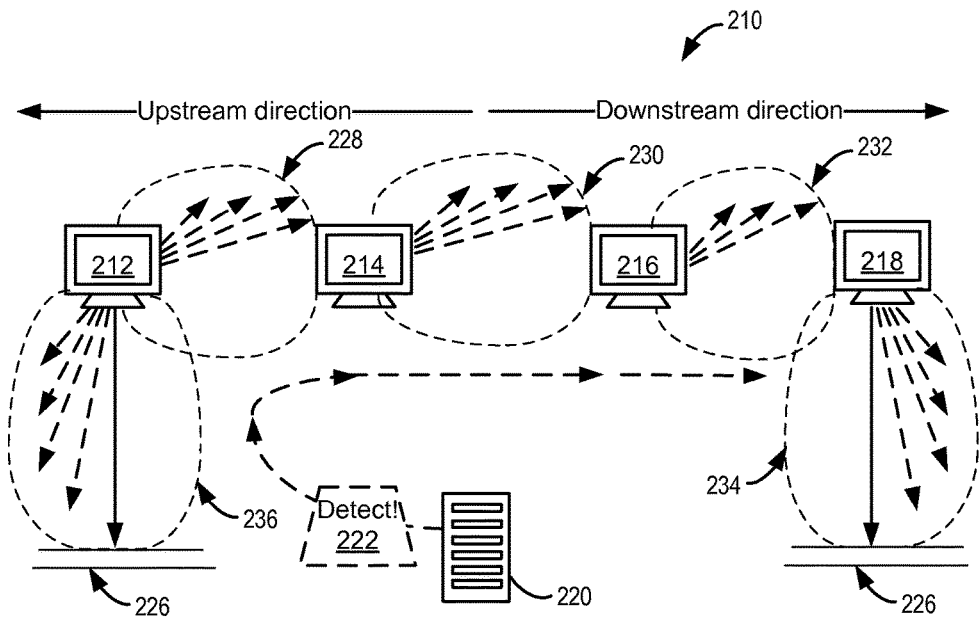
FIGS. 3A-3D each illustrate respective local scans for unmanaged assets that are performed by managed machines in response to a detection request propagated along a linear communication orbit in a managed network, in accordance with some embodiments.

FIG. 3A illustrates that, in some embodiments, when a detection request (e.g., detection request 222) is issued by server 220 and propagates from machine to machine along linear communication orbit 210 in the downstream direction, each managed machine performs a respective local scan for unmanaged assets in its immediate local neighborhood in the downstream direction. For example, head node 212 performs a local scan for unmanaged assets in a respective portion of network (e.g., local portion 228) between itself and its successor node 214. Similarly, intermediate node 214 performs a local scan for unmanaged assets in a respective portion of network (e.g., local portion 230) between itself and its successor node 216. Similarly, intermediate node 216 performs a local scan for unmanaged assets in a respective portion of network (e.g., local portion 232) between itself and its successor node 218. Tail node 218 performs a local scan for unmanaged assets in a respective portion of network (e.g., local portion 234) between itself and the last IP address of the local sub-network (e.g., an IP address ending with 0.255).

In some embodiments, for tail node 218, the respective local portion of the network (e.g., local portion 234) is associated with a range of unique identifiers between the unique identifier of tail node 218 and a unique identifier corresponding to the last ordinal position in an ordered sequence of all unique identifiers that may be assigned to a machine (managed or unmanaged) within the network (or within the sub-network defined by firewall 226).

In some embodiments, tail node 218 keeps a record of the range of all possible unique identifiers that may be assigned to machines in the network (or within the sub-network defined by firewall 226), and identifies the range of identifiers to scan for unmanaged assets (i.e., the local portion 234) based on its own unique identifier and the last possible unique identifier of that range.

In some embodiments, tail node 218 scans a respective local portion of the network associated with a range of IP addresses between the respective IP address of the tail node, and the last IP address that may be assigned to a machine within the firewall of the network or sub-network. In some embodiments, tail node 218 scans a respective local portion of the network associated with a range of IP addresses between the respective IP address of tail node 218, and the last IP address that may be assigned to a machine (managed or unmanaged) in the network according to a predetermined IP address assignment rule (e.g., no more than 256 IP addresses (or a smaller number of IP addresses) within a LAN, and/or only even or odd IP addresses within a respective LAN, etc.).

As shown in FIG. 3A, in some embodiments, for head node 212, in addition to performing a local scan for unmanaged asset in the respective portion of the network (e.g., local portion 228) between itself and its successor node 214, head node 212 also performs a local scan for unmanaged asset in the respective portion of the network (e.g., local portion 236) between itself and the first IP address of the local sub-network (e.g., an IP address ending with 0.0). In some embodiments, for head node 212, the respective local portion of the network (e.g., local portion 236) is associated with a range of unique identifiers between the unique identifier of head node 212 and a unique identifier corresponding to the first ordinal position in the ordered sequence of all unique identifiers that may be assigned to a machine (managed or unmanaged) within the network (or within the sub-network defined by firewall 226).

In some embodiments, head node 212 keeps a record of the range of all possible unique identifiers that may be assigned to machines in the network (or within the sub-network defined by firewall 226), and identifies the range of identifiers to scan for unmanaged assets (e.g., local portion 236) based on its own unique identifier and the first possible unique identifier of that range.

In some embodiments, head node 212 scans a respective local portion of the network associated with a range of IP addresses between the respective IP address of the head node and the smallest IP address that may be assigned to a machine within the firewall of the network or sub-network. In some embodiments, head node 212 scans a respective local portion of the network associated with a range of IP addresses between the respective IP address of the head node and the first IP address that may be assigned to a machine (managed or unmanaged) in the network according to a predetermined rule (e.g., first 10 IP addresses are reserved and not assigned within a LAN, and/or only even or odd IP addresses within a respective LAN, etc.).

Based on the above, head node 212 in the exemplary embodiments shown in FIG. 3A will scan a local neighborhood (e.g., local portion 228 and local portion 236) spanning the entire range of unique identifiers from the first possible unique identifier of the network to the unique identifier immediately preceding the unique identifier of the successor node 214.

Figure 3B:
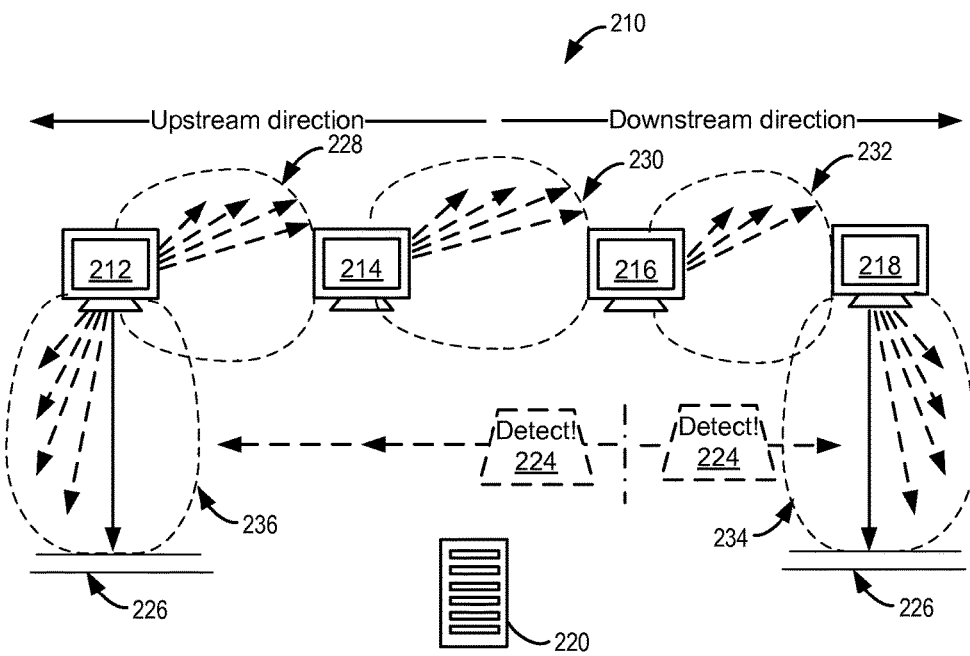

FIG. 3B illustrates the same scanning behaviors as those shown in FIG. 3A. In FIG. 3B, however, a detection request (e.g., detection request 224) is not issued by the server (e.g., server 220). Instead, detection request 224 is issued by a managed machine (e.g., intermediate node 216) in linear communication orbit 210. Detection request 224 is propagated from the requestor machine (e.g., intermediate node 216) in the upstream direction until reaching head node 212 of linear communication orbit 210. At the same time, detection request 224 is propagated in the downstream direction until reaching tail node 218 of linear communication orbit 210.

In the exemplary embodiment shown in FIG. 3B, regardless of the direction from which detection request 224 has been received, each managed machine performs the local scan for unmanaged assets on a respective portion of network that is adjacent to the managed machine in the downstream direction. In addition, head node 212 also performs the local scan on a respective portion of network that is adjacent to head node 212 in the upstream direction. In other words, head node 212 scans a respective local neighborhood including local portions 228 and 236, intermediate node 214 scans local portion 230, intermediate node 216 scans local portion 232, and tail node 218 scans local portion 234, respectively. In addition, as shown in FIG. 3B, detection request 224 originates from a requestor machine that is also a managed machine (e.g., intermediate node 216) in the linear communication orbit, and the requestor machine (e.g., intermediate node 216) also performs the local scan in its respective local portion (e.g., local portion 232) like all the other managed machines in the linear communication orbit.

In some embodiments (not shown in FIG. 3B), if the requestor machine is head node 212, head node 212 only propagates the detection request in the downstream direction, but performs the local scan in both local portion 236 and local portion 228. In some embodiments (not shown in FIG. 3B), if the requestor machine is tail node 218, tail node 218 only propagates the detection request in the upstream direction, and performs the local scan in local portion 234.

Figure 3C:
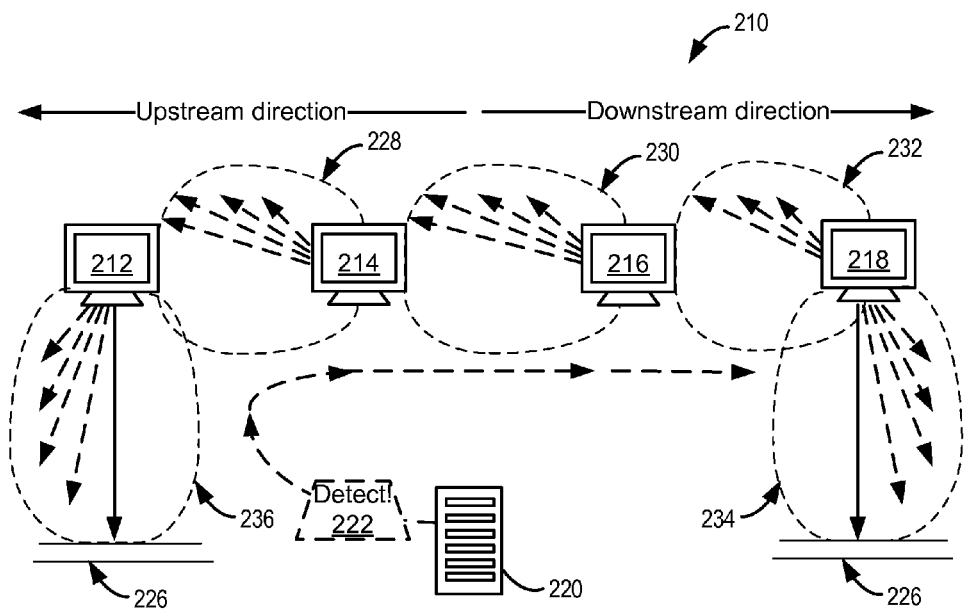
Figure 3D:
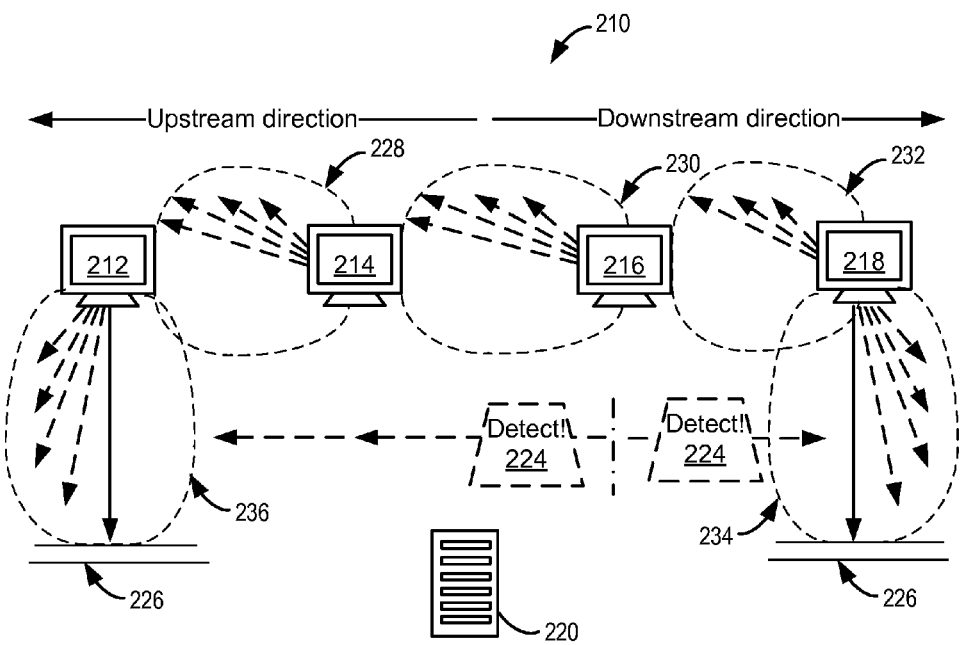

FIGS. 3C and 3D each illustrate exemplary scanning behaviors similar to those shown in FIGS. 3A and 3B. As shown in FIGS. 3C and 3D, each managed machine performs a local scan for unmanaged assets on a respective portion of the network that is adjacent to the managed machine in the upstream direction, regardless of the direction from which the detection request has been received by the managed machine. In addition, a tail node of the linear communication orbit further performs the local scan on a portion of the network that is adjacent to the tail node in the downstream direction. In other words, in FIGS. 3C and 3D, head node 212 scans local portion 236, intermediate node 214 scans local portion 222, intermediate node 216 scans local portion 230, and tail node 218 scans a respective local neighborhood including local portions 232 and 234, respectively.

In some embodiments, a local neighborhood of each managed machine (other than the special case for the head node or tail node) is precisely defined as a range of unique identifiers between the respective unique identifier of the managed machine itself and the unique identifier of its immediate neighbor node in either the downstream direction (e.g., as shown in FIGS. 3A and 3B) or the upstream direction (e.g., as shown in FIGS. 3C and 3D). In some embodiments, the local neighborhood of each managed machine need not be as tightly defined as that shown in FIGS. 3A-3D. For example, in some embodiments, each managed machine, in addition to scanning the portion of the network that is adjacent to itself in the downstream or the upstream direction, also optionally scans all or a small part of a local portion of the network that is adjacent to the managed machine in the opposite direction. In such embodiments, there will be some overlap in the local portions that are scanned by each pair of adjacent managed machines along the linear communication orbit. But such redundancy may be beneficial to capture at least some of the unmanaged assets that happen to join the network right after the scan by one managed machine but before the scan by the other managed machine of the pair. Another advantage of having each managed machine scan the local portions adjacent to itself in both the upstream direction and the downstream direction is that, this way, the head node and the tail node can follow substantially the same programming instructions to perform the scans for unmanaged assets, as do all the other managed machines in the linear communication orbit.

Figure 3E:
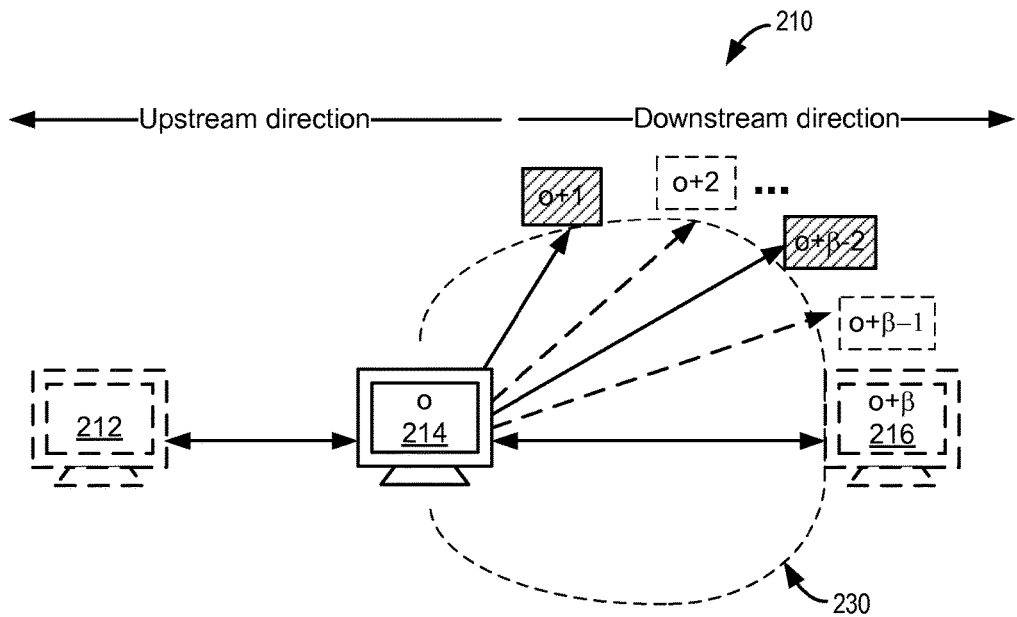
FIGS. 3E-3F each illustrate detection of one or more unmanaged assets during a respective local scan performed by a managed machine in a respective local neighborhood of the managed machine, in accordance with some embodiments.
Figure 3F:
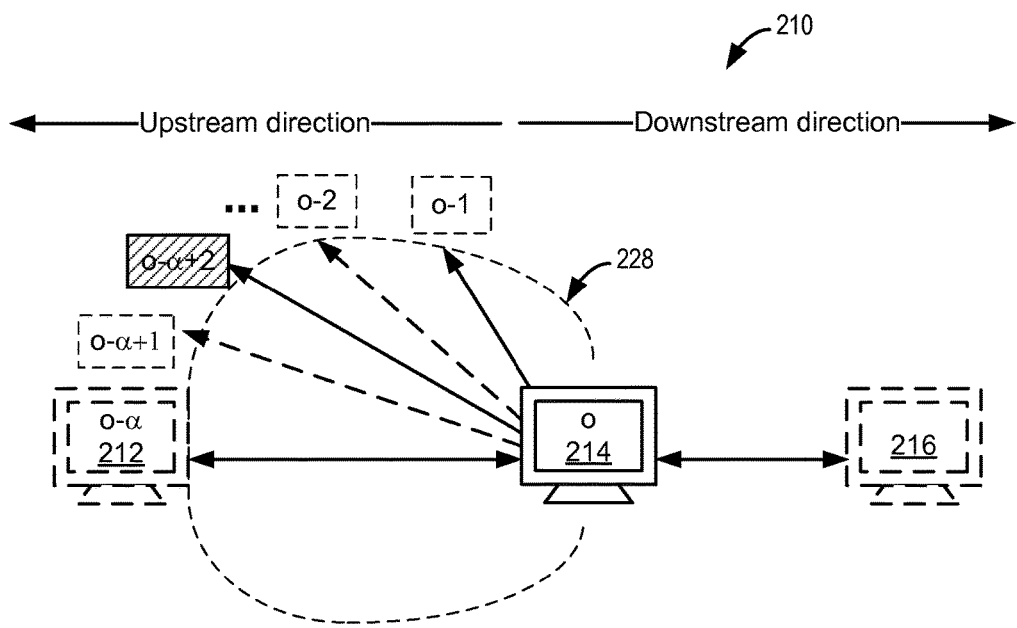

FIGS. 3E-3F each illustrate detection of one or more unmanaged assets during a respective local scan performed by a managed machine in a respective local neighborhood of the managed machine in accordance with some embodiments.

In some embodiments, the managed machines (e.g., managed machines 212-218) are organized along the linear communication orbit in accordance with a sequential order of the respective IP addresses assigned to the managed machines. In some embodiments, the downstream direction of the linear communication orbit is along the direction of increasing IP address values. As shown in FIG. 3E, in some embodiments, when a managed machine (e.g., intermediate node 214) performs the local scan on the portion of network (e.g., local portion 230) that is adjacent to the managed machine in the downstream direction, the managed machine attempts to contact each IP address that is within the range (e.g., IP address values "o+1", "o+2", . . . , "o+β−1") from the IP address (e.g., IP address value "o") of the managed machine up to the IP address (e.g., IP address value "o+β") of the adjacent successor node (e.g., intermediate node 216) of the managed machine.

In some embodiments, when contacting each IP address within the local neighborhood (e.g., local portion 230), the managed machine (e.g., intermediate node 214) provides an inquiry to an unmanaged machine possible present at the IP address, regarding one or more of the hardware device type, operating system type and version, a computer name, etc, of the unmanaged machine. In some embodiments, if there is a live unmanaged machine at a particular IP address (e.g., IP address values "o+1" or "o+β−1", as shown in FIG. 3E) contacted by the managed machine, the live unmanaged machine responds to the inquiry with the requested information.

In some embodiments, for each received detection request (e.g., detection request 222 or 224), the managed machine (e.g., intermediate node 214) send an inquiry to each IP address within its local neighborhood (e.g., local portion 230), and generates a respective local report to include the information related to all unmanaged assets that have responded to the inquiry. In some embodiments, the local report includes one or more of the MAC address, IP address, hardware device type, operating system type and version, a computer name, etc, of each unmanaged machine that has responded to the inquiry.

In some embodiments, the entire local scan (e.g., the scan of local portion 230) can be completed in seconds, because all communications are local and requires minimal routing, and the number of IP addresses that need to be scanned is sufficiently small (e.g., around 10). In some embodiments, in order to evenly distribute the scanning load on all of the managed machines in the network, a server (e.g., server 220) optionally chooses an IP address for each new managed machine in the most sparsely populated portion of the linear communication orbit, when the new managed machine first joins the network.

FIG. 3F shows the local scan performed by a managed machine on a local portion of the network in the upstream direction. As shown in FIG. 3F, in some embodiments, when a managed machine (e.g., intermediate node 214) performs the local scan on the portion of network (e.g., local portion 228) that is adjacent to the managed machine in the upstream direction, the managed machine attempts to contact each IP address that is within the range (e.g., IP address values "o−α+1", "o−α+2", . . . ""o−2", "o−1") from the IP address (e.g., IP address value "o") of the managed machine down to the IP address (e.g., IP address value "o−α") of the adjacent predecessor node (e.g., head node 212) of the managed machine. In some embodiments, if there is a live unmanaged machine at a particular IP address (e.g., IP address "o−α+2") contacted by the managed machine, the live unmanaged machine respond to the inquiry with the requested information.

In some embodiments, if a managed machine is (e.g., head node 212 in FIGS. 3A and 3B, or tail node 216 in FIGS. 3C and 3D) to perform a local scan in both the upstream direction and the downstream direction, the scan can be performed in a manner that combines the scans shown in FIGS. 3E and 3F.

Figure 4A:
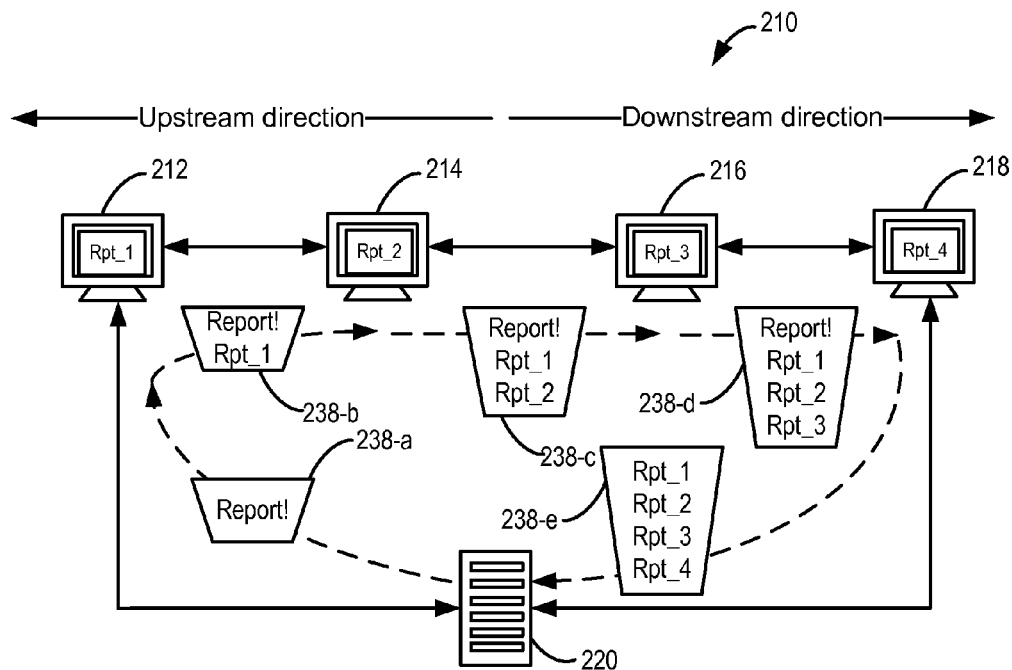
FIGS. 4A-4B each illustrate collection of local status reports for unmanaged assets in response to a report request propagated along a linear communication orbit of a managed network in accordance with some embodiments.
Figure 4B:
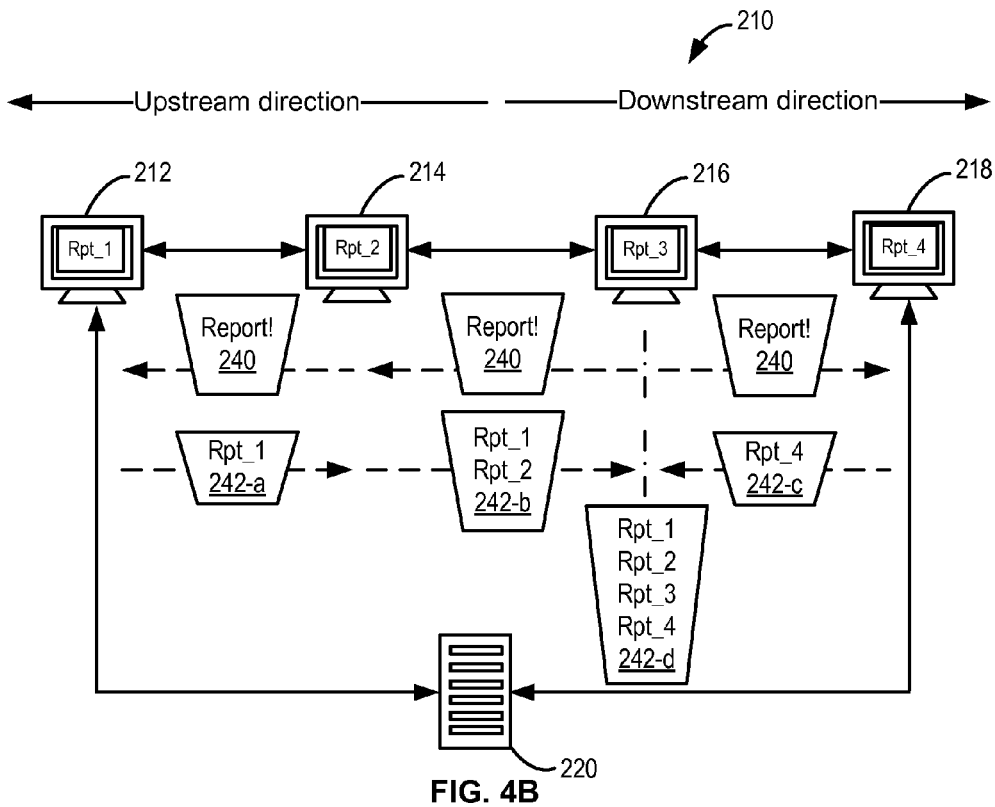

FIGS. 4A-4B each illustrate collection of local status reports for unmanaged assets in response to a report request propagated along a linear communication orbit of a managed network in accordance with some embodiments.

As shown in FIG. 4A, a respective local report (e.g., local reports "Rpt_1", "Rpt_2", "Rpt_3, and "Rpt_4", respectively) has been generated on each managed machine (e.g., managed machines 212, 214, 216, and 218, respectively) that has performed a local scan for unmanaged assets in response to a detection request (e.g., detection request 222 in FIG. 3A or 3C) received by the managed machine. The respective local report of each managed machine includes information (e.g., IP address, MAC address, device name, device type, OS name, OS version, etc.) related to zero or more unmanaged assets that has been detected in the local neighborhood scanned by the managed machine. In some embodiments, no local report is generated by a managed machine if the managed machine does not detect any live unmanaged assets in its respective local neighborhood.

In some embodiments (not shown in the Figures), each managed machine sends its local report to its respective downstream neighbor, where the local report is forwarded from machine to machine along the linear communication orbit until it reaches the server (e.g., server 220). In such embodiments, each managed machine forwards all local reports it has received from the upstream direction as well as its own local report to its respective downstream neighbor, where each local report is forwarded further downstream until the local report reaches the server. The server then aggregates all of the local reports received from the tail node of the linear communication orbit to generate an aggregated report on all of the unmanaged assets currently detected in the network.

In some embodiments, as shown in FIG. 4A, as a reporting request from the server is propagated from one managed machine to the next along the linear communication orbit, each managed machine augments the report request with a respective local report generated by the managed machine. For example, as shown in FIG. 4A, server 220 issues a reporting request 238-a to head node 212 shortly after the issuance of the detection request (e.g., detection request 222 in FIG. 3A or 3C). When reporting request 238-a is received by head node 212, head node 212 augments report request 238-a by adding its respective local report (e.g., "Rpt_1") to reporting request 238-a, and forwards the augmented reporting request (e.g., reporting request 238-b) to its successor node (e.g., intermediate node 214). Similarly, when the augmented reporting request (e.g., reporting request 238-b) is received by intermediate node 214, intermediate node 214 augments the received reporting request 238-b by adding its respective local report (e.g., "Rpt_2") to the received reporting request 238-b, and forwards the augmented reporting request 238-c to its successor node (e.g., intermediate node 216). When the reporting request 238-c is received by intermediate node 216, intermediate node 216 augments the received reporting request 238-c by adding its respective local report (e.g., "Rpt_3") to the received reporting request 238-c, and forwards the augmented reporting request 238-d to its successor node (e.g., tail node 218). When tail node 218 receives the reporting request 238-d, the tail node augments the received reporting request 238-d with its local report (e.g., Rpt_4), and sends the augmented report request 238-e to server 220. Therefore, when server 220 finally receives the reporting request (e.g., reporting request 238-e), the reporting request includes information identifying all of the unmanaged assets that have been detected by the managed machines in the linear communication orbit.

In some embodiments, the reporting request that has been augmented with the local reports from managed machines identifies the detection request to which it is responding. In some embodiments, each managed machine simply appends its respective local report to the end of the reporting request it has received from its predecessor node. In some embodiments, each managed machine performs some simple analysis and/or aggregation of its own local report and the report included in the received reporting request.

FIG. 4B shows how an aggregated report is propagated back to a requester machine, if the detection request (e.g., detection request 224) was not issued from the server (e.g., server 220), but from an intermediate machine (e.g., intermediate node 216) in the linear communication orbit (e.g., linear communication orbit 210).

As shown in FIG. 4B, a respective local report (e.g., local reports "Rpt_1", "Rpt_2", "Rpt_3", and "Rpt_4", respectively) has been generated on each managed machine (e.g., managed machines 212, 214, 216, and 218, respectively) that has performed a local scan for unmanaged assets in response to a detection request (e.g., detection request 224 in FIG. 3B or 3D) received (e.g., in the case of machines 212, 214, and 218) or self-generated (e.g., in the case of machine 216) by the managed machine.

In some embodiments, the requestor machine (e.g., intermediate node 216) sends a reporting request (e.g., reporting request 240) in both the upstream and the downstream direction. The reporting request from the requestor machine is propagated from one managed machine to the next along the linear communication orbit in both the upstream and the downstream directions, until the reporting request has reached the head node (e.g., head node 212) and the tail node (e.g., tail node 218).

In some embodiments, as shown in FIG. 4B, head node 212 initiates reporting message 242-a to be propagated downstream, and includes its local report (e.g., "Rpt_1") in reporting message 242-a. When the report message is received by each intermediate machine (e.g., intermediate node 214) preceding the requestor machine (e.g., intermediate node 216), the intermediate machine further augments the received reporting message (e.g., report message 242-a) by adding its own local report (e.g., Rpt_2) to the received reporting message, and sends the augmented reporting message (e.g., reporting message 242-b) to its respective successor node (e.g., intermediate node 216).

Similarly, in the upstream direction, tail node 218 initiates reporting message 242-c to be propagated upstream toward the requestor machine 216, and includes its local report (e.g., "Rpt_4") in reporting message 242-c. In this particular example shown in FIG. 4B, there is no intermediate node between tail node 218 and the requestor machine 216, so reporting message 242-c is directly sent from tail node 218 to the requestor machine 216. Normally, if there are one or more intermediate nodes between the tail node and the requestor machine, when the reporting message is received by each intermediate machine succeeding the requestor machine, the intermediate machine further augments the received reporting message by adding its own local report to the received reporting message, and then sends the augmented reporting message to its respective predecessor node.

As shown in FIG. 4B, when the requestor machine (e.g., intermediate node 216) has received the reporting messages from both its upstream neighbor and its downstream neighbor, the requestor machine combines the two reporting messages (e.g., reporting message 242-b and 242-c) as well as its own local report to generate an aggregated report (e.g., report 242-d). The aggregated report now includes information identifying all of the unmanaged assets that have been detected by the managed machines in the linear communication orbit. In some embodiments, the reporting message that is propagated along the linear communication orbit identifies the detection request and/or the reporting request to which it is responding.

In some embodiments, each intermediate managed machine simply appends its respective local report to the end of the reporting message it has received from its predecessor or successor node. In some embodiments, each intermediate managed machine performs some simple analysis and/or aggregation of the information included its own local report and the report included in the received reporting message.

Figure 5A:
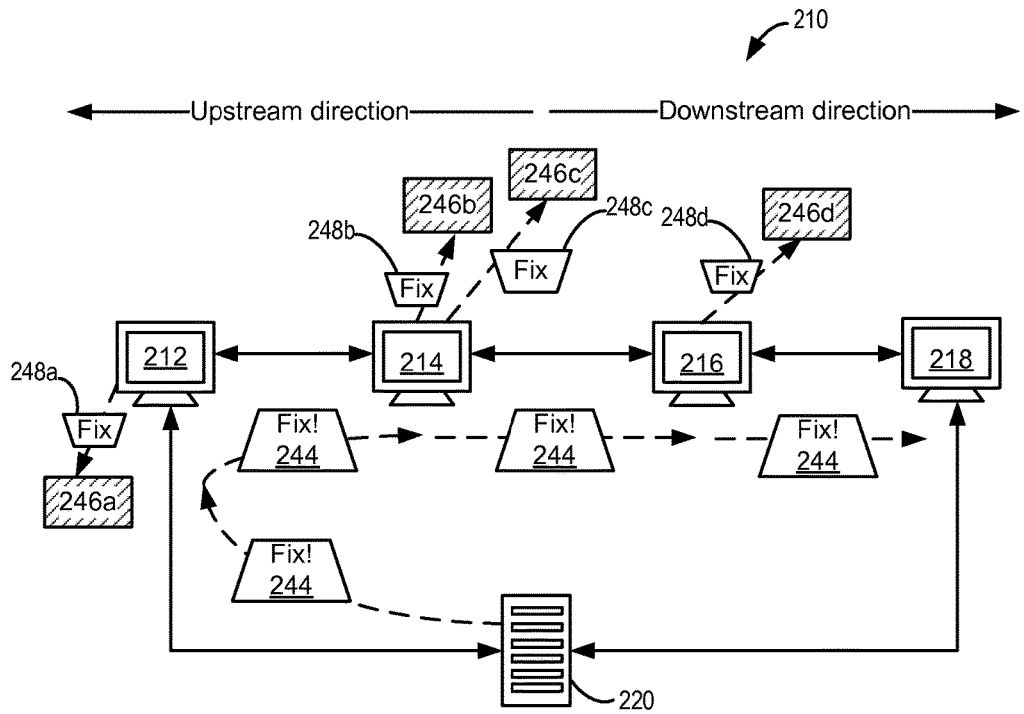
FIGS. 5A-5D each illustrate performance of remedial actions on unmanaged assets detected in a managed network in accordance with some embodiments.
Figure 5B:
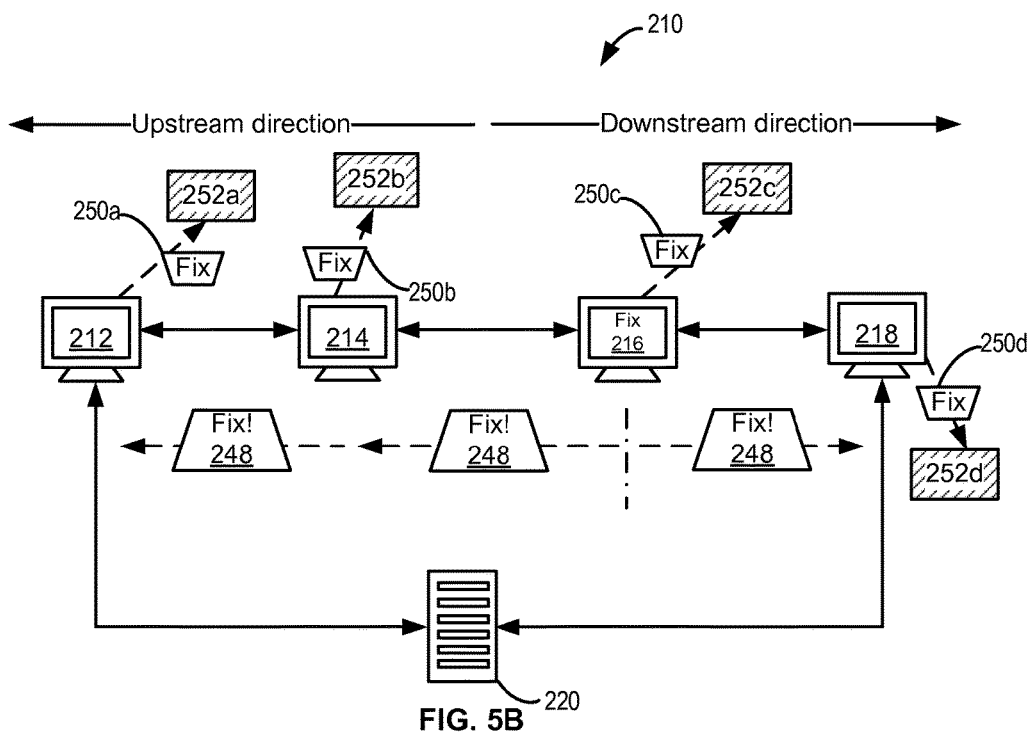
Figure 5C:
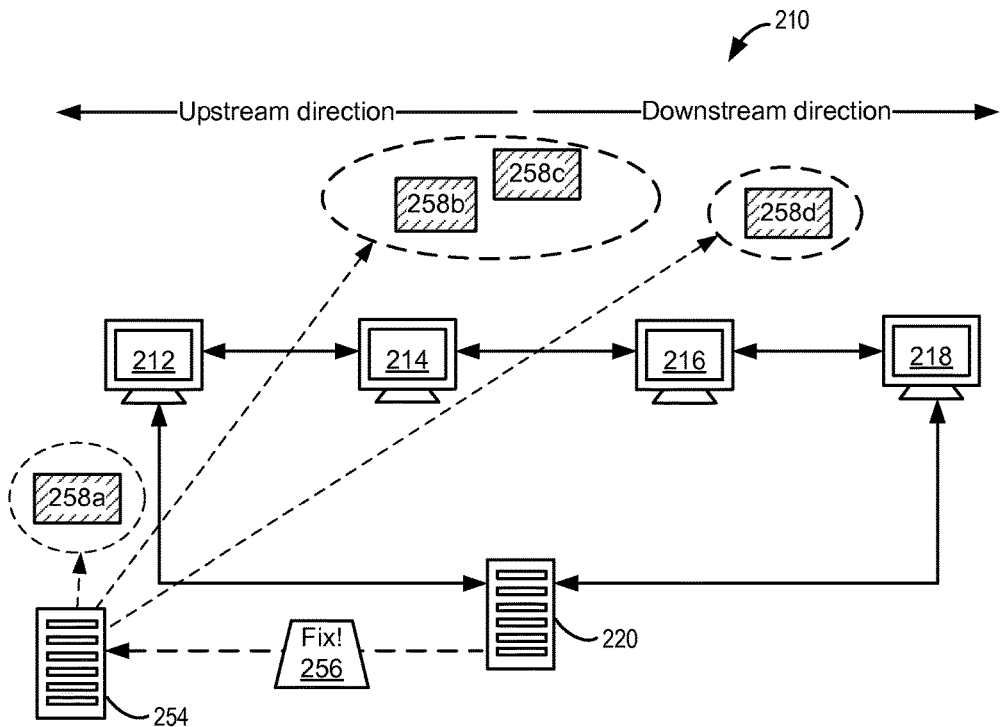
Figure 5D:
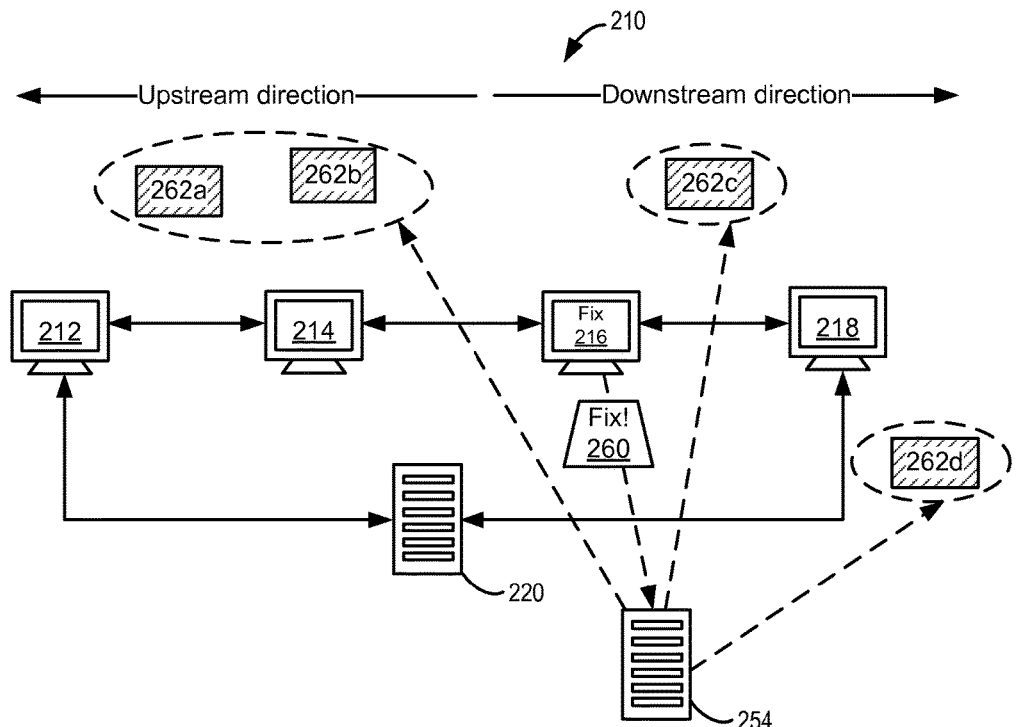

FIGS. 5A-5D each illustrate performance of remedial actions on the unmanaged assets (e.g., unmanaged machines 246a-d) detected in a managed network in accordance with some embodiments. Specifically, FIGS. 5A-5B each illustrate exemplary embodiments in which remedial actions are carried out by individual managed machines in the linear communication orbit. FIGS. 5C-5D each illustrate exemplary embodiments in which remedial actions are carried out by a dedicated remedial server (e.g., remedial server 254).

As shown in FIG. 5A, after an aggregated report (e.g., a report in the report request 238-*e* in FIG. 4A) has been obtained by a requestor (e.g., server 220), the server optionally generates one or more remedial instructions based on the information obtained about unmanaged assets (e.g., unmanaged machines 246*a-d*) in the network. In some embodiments, the server generates a single remedial request (e.g., remedial request 244) for each detection request (e.g., detection request 222 in FIG. 2A) it has issued, where the remedial request includes respective remedial instructions (e.g., remedial instructions 248*a*, 248*b-c*, and 248*d*, respectively) to each managed machine (e.g., managed machines 212, 214, and 216, respectively) that has detected at least one unmanaged asset that needs to be acted upon (e.g., unmanaged machines 246*a*, 246*b-c*, and 246-*d*, respectively). In some embodiments, the server generates more than one remedial request for each detection request, where each remedial request includes respective remedial instructions to a respective subset of the managed machines that have detected at least one unmanaged asset.

In some embodiments, each remedial instruction aims to remedy a respective type of unmanaged assets (e.g., unauthorized machines, authorized but unmanaged machines, malicious machines, vulnerable machines, etc.). In some embodiments, each remedial instruction aims to remedy a respective type of vulnerability (e.g., lacking security management software, lacking a firewall, lacking a security patch, lacking an antivirus software, having a known security hole, etc.) associated with the unmanaged assets. In some embodiments, each remedial instruction aims to remedy a respective set of issues that are associated with a respective unmanaged machine that has been detected.

In some embodiments, as a remedial request including more than one remedial instructions are propagated from server 220 to head node 212, and then from one managed machine to the next through the linear communication orbit, each managed machine (e.g., managed machine 214) deciphers the remedial request (e.g., remedial request 244), determines whether a particular remedial instruction (e.g., remedial instructions 248-*b* and 248-*c*, respectively) is applicable to any unmanaged asset(s) that have been detected within its own local portion of the network.

In some embodiments, each managed machine determines the applicability of each remedial instruction based on the criteria set forth in the remedial instruction and the properties of the unmanaged assets it has detected. In some embodiments, the remedial instruction identifies the particular unmanaged machines by their unique identifiers, such that each managed machine is able to identify the correct remedial instructions to carry out for each unmanaged machine that it has detected based on the unique identifiers.

In some embodiments, each managed machine carries out the remedial instructions applicable to the unmanaged machines it has detected by: providing a software application or patch to the unmanaged machines, setting up quarantine around the unmanaged machines, and/or providing a warning message on the unmanaged machines, etc. In some embodiments, a managed machine optionally carries out the remedial instructions by assisting the unmanaged machines it has detected in obtaining the necessary software to become a managed machine.

FIG. 5B illustrate the propagation of a remedial request (e.g., remedial request 248) that is similar to the remedial request shown in FIG. 5A, except that the remedial request is issued by a requestor machine (e.g., intermediate node 216) other than the server (e.g., server 220). As shown in FIG. 5B, once the requestor machine (e.g., intermediate node 216) has obtained an aggregated report (e.g., report message 242-*d*) identifying all of the unmanaged assets detected in the network, the requestor machine optionally generates and sends out a remedial request (e.g., remedial request 248) to act on the unmanaged assets.

As shown in FIG. 5B, the requestor machine (e.g., intermediate node 216) sends the remedial request (e.g., remedial request 248) in both the upstream and the downstream directions. When each managed machine receives the remedial request from a respective direction (e.g., an upstream or downstream direction), the managed machine forwards the remedial request further along that respective direction. In addition, each managed machine also deciphers the remedial request to identify the remedial instructions applicable to the unmanaged assets that have been detected in its local portion of the network.

As shown in FIG. 5B, when the requestor machine 216 sends remedial request 248 to intermediate node 214, intermediate node 214 forwards remedial request 248 to head node 212. In addition, intermediate node 214 also deciphers a copy of remedial request 248 to obtain remedial instructions 250*b* which is applicable to unmanaged machine 252*b* that has been detected within its local portion of the network. When head node 212 receives remedial request 248, it does not forward remedial request 248 further in the upstream direction, and instead, only deciphers remedial request 248 to obtain remedial instructions 250*a* which is applicable to unmanaged machine 252*a* that has been detected within its local portion of the network. Similarly, in the downstream direction, when tail node 218 receives remedial request 248 from intermediate node 216, it does not forward it further in the downstream direction, and instead, only deciphers remedial request 248 to obtain remedial instructions 250*d* for the unmanaged machine (e.g., unmanaged machine 252*d*) that has been detected within its local portion of the network. In the example shown in FIG. 5B, the requestor machine 216 also prepares the remedial instructions for the unmanaged machine (e.g., unmanaged machine 252*c*) that has been detected within its local portion of the network.

FIGS. 5C and 5D illustrate exemplary embodiments in which remedial instructions are generated and sent to a remedial server (e.g., remedial server 254), rather than the managed machines in the linear communication orbit. In some embodiments, the remedial server is a dedicated server that has special privileges to carry out remedial actions (e.g., strict quarantine, exclusion from the network, etc.) on the unmanaged assets detected in the network. In some embodiments, a particular managed machine (e.g., a requestor machine, a head node, a tail node, or an intermediate managed machine) in the linear communication orbit may be given the special privileges to serve as a remedial server.

As shown in FIG. 5C, when server 220 receives the aggregated report (e.g., report 238-*e* in FIG. 4A) identifying the unmanaged assets detected in the network, server 220 generates a remedial request (e.g., remedial request 256) and sends the remedial request to remedial server 254. Remedial server 254 deciphers the remedial request to obtain remedial instructions for each of one or more unmanaged machines (e.g., unmanaged machines 258*a-d*) detected in the network. Remedial server 254 then individually carries out the remedial instructions (e.g., to quarantine, to remove, to disable, to install management software, and/or to perform diagnostic procedures, etc.) with respect to each of the one or more unmanaged machines.

Similarly, as shown in FIG. 5D, when requestor machine 216 obtains the aggregated report (e.g., report 242-d) identifying the unmanaged assets detected in the network, requestor machine 216 generates a remedial request (e.g., remedial request 260) and sends the remedial request to remedial server 254. Remedial server 254 deciphers the remedial request to obtain remedial instructions for each of one or more unmanaged machines (e.g., unmanaged machines 262a-d). Remedial server 254 then individually carries out the remedial instructions (e.g., to quarantine, to remove, to disable, to install management software, and to perform diagnostic procedures, etc.) with respect to each of the one or more unmanaged machines.

Exemplary embodiments described with respect to FIGS. 2A-5B are merely illustrative. A person skilled in the art would recognize different features described with respect to these figures may be combined in any particular embodiments. Some functions may be combined and implemented by a single machine or divided among several machines. Other configurations are possible.

FIGS. 6A-6F are flow charts illustrating various actions of a managed machine that facilitates the fast detection of unmanaged assets and subsequent management of the detected unmanaged assets in accordance with some embodiments.

Figure 6A:
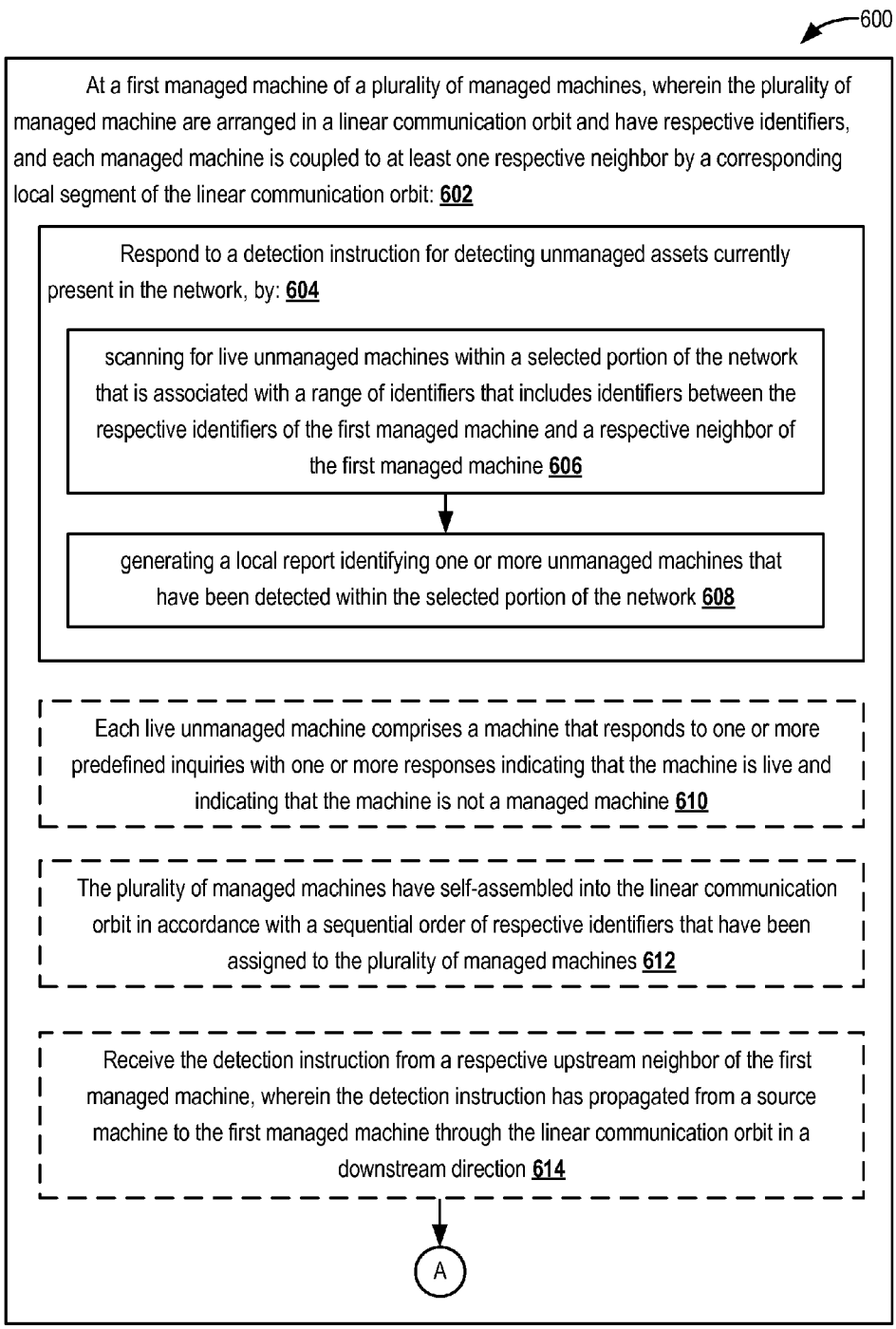
FIGS. 6A-6F are flow diagrams illustrating various actions of a managed machine that facilitates the fast detection of unmanaged assets and subsequent management of the detected unmanaged assets in accordance with some embodiments.
Figure 6B:
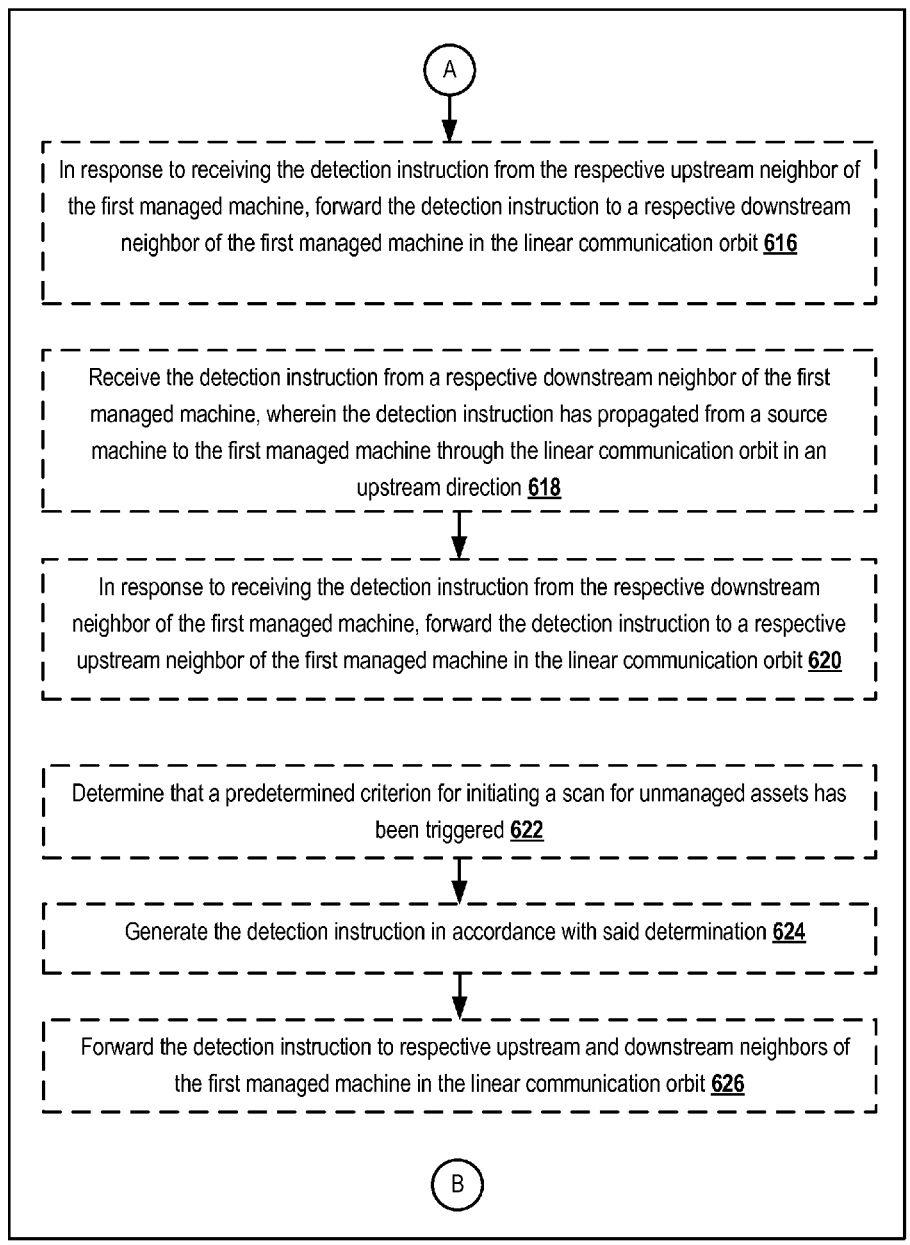
Figure 6C:
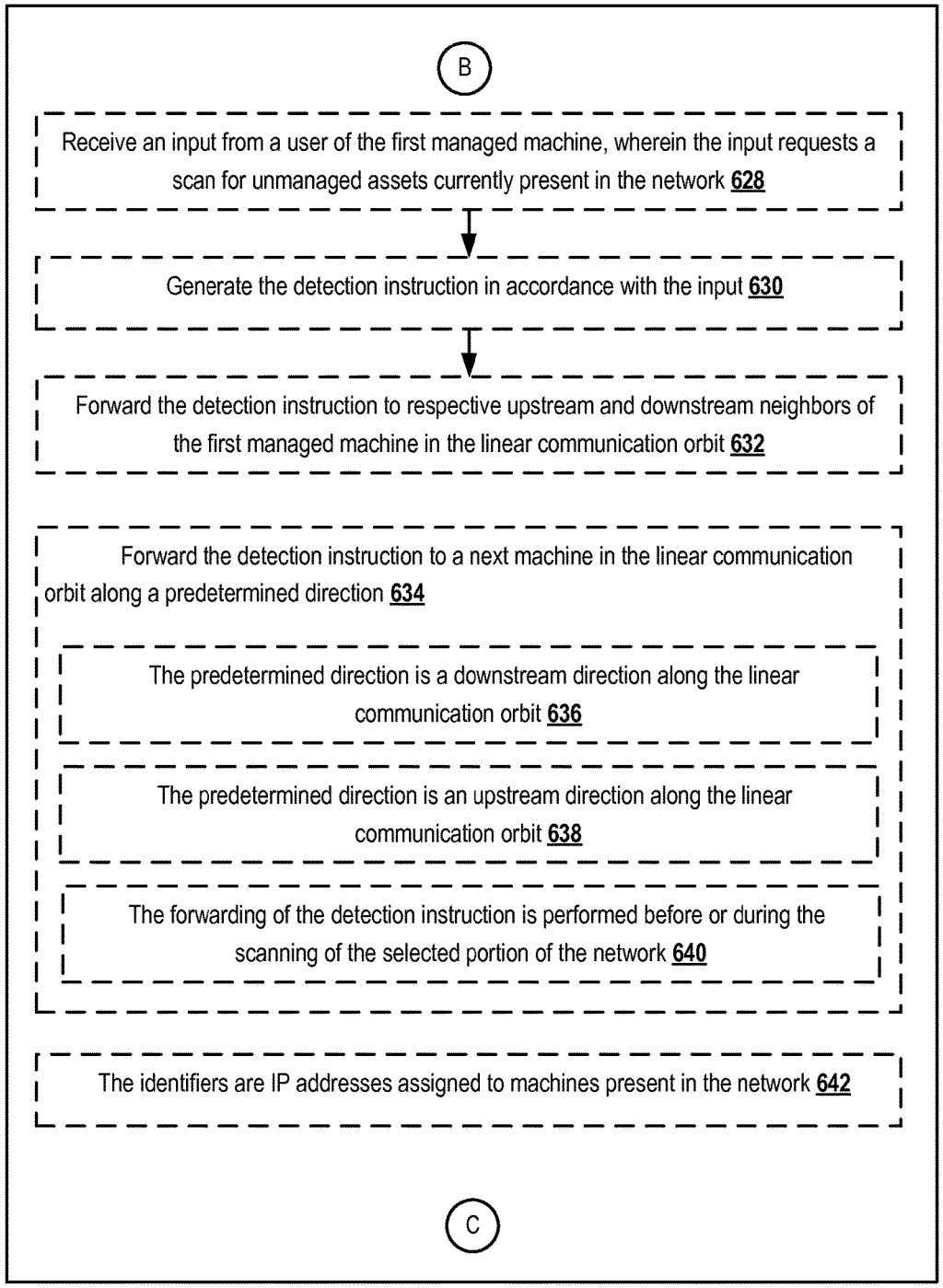
Figure 6D:
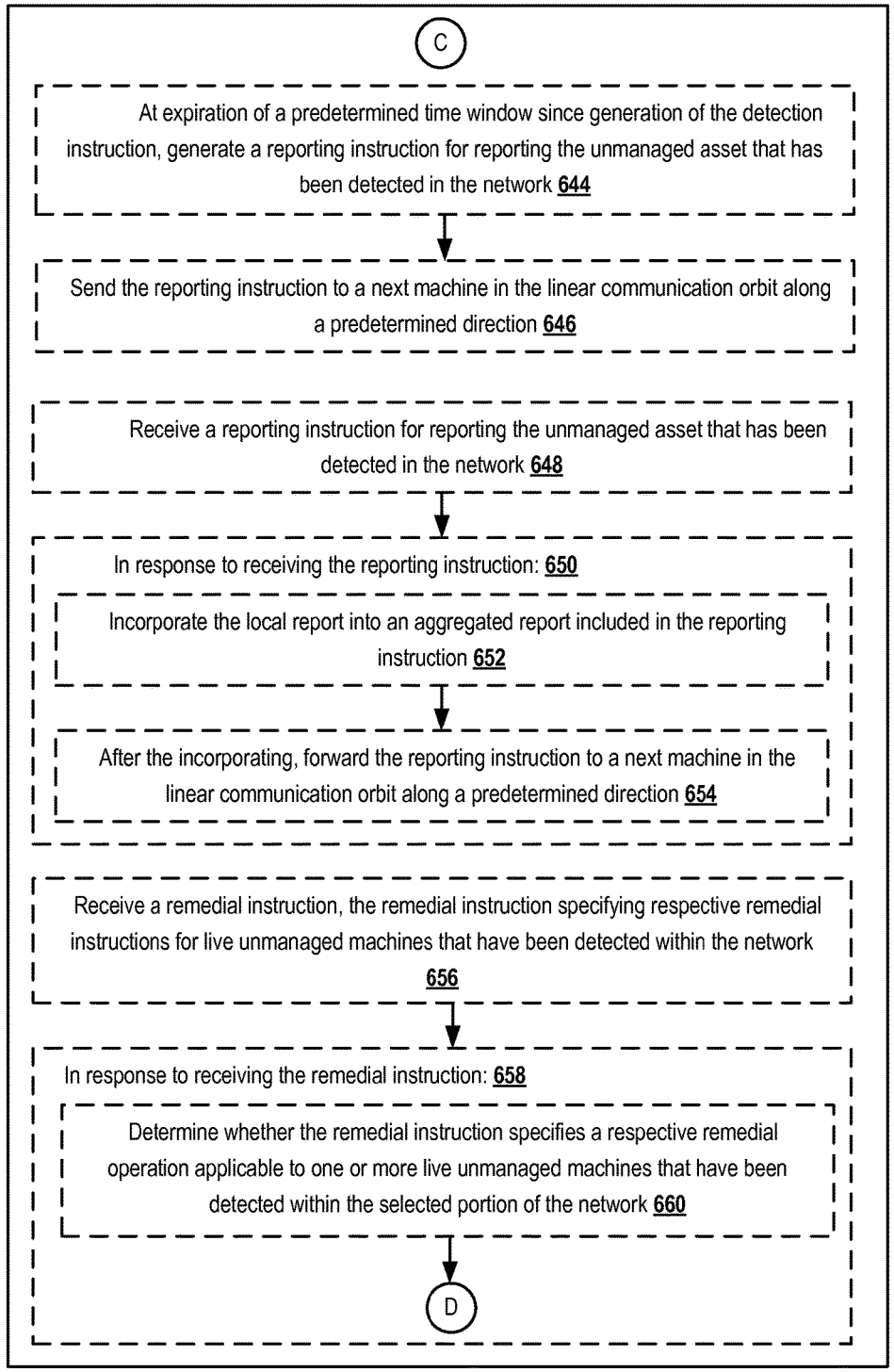
Figure 6E:
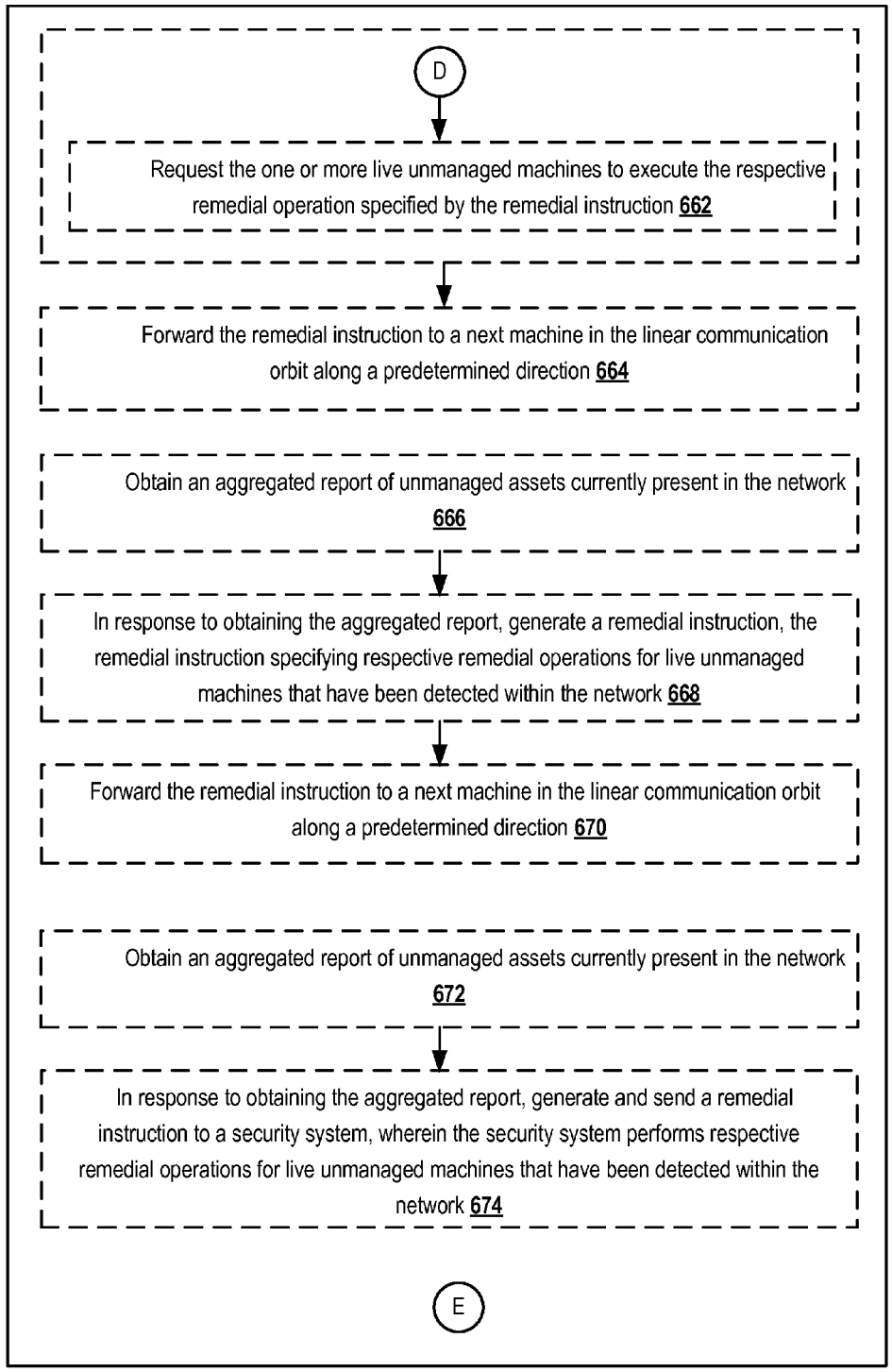
Figure 6F:
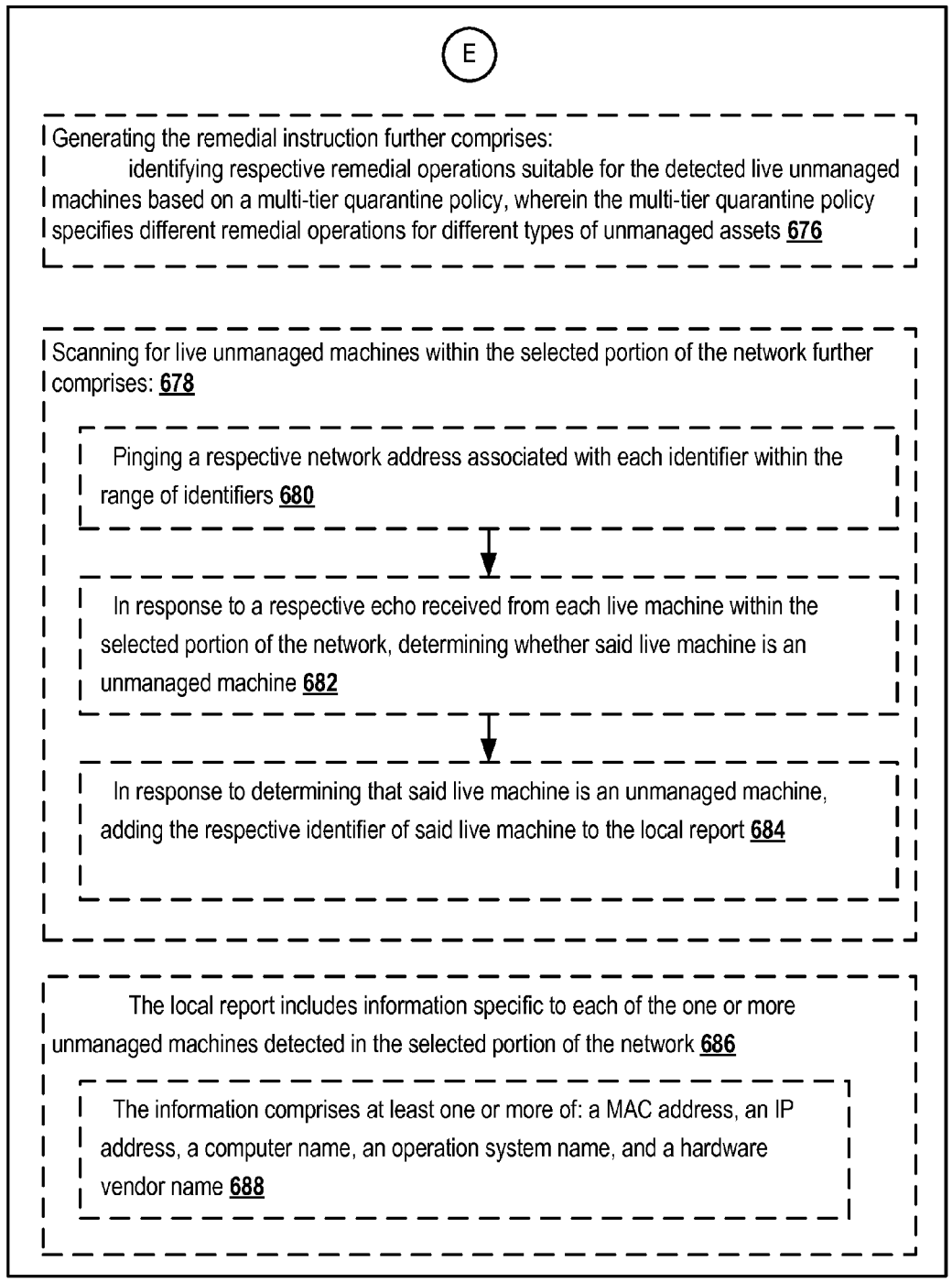

In some embodiments, as shown in FIG. 6A, a method 600 of monitoring unmanaged assets in a network having a plurality of managed machines is performed (602) at a first managed machine (e.g., "the first managed machine" as used herein may be the head node, the tail node, or an intermediate node in various exemplary scenarios) of the plurality of managed machines, where the plurality of managed machine are arranged in a linear communication orbit (e.g., linear communication orbit 210 in FIGS. 2A-5B) and have respective identifiers (e.g., IP addresses), and each managed machine is coupled to at least one respective neighbor (e.g., an upstream neighbor and/or a downstream neighbor) by a corresponding local segment (e.g., local segment shown in FIGS. 1B-1D) of the linear communication orbit.

In some embodiments, the first managed machine responds (604) to a detection instruction for detecting unmanaged assets currently present in the network, by: scanning (606) for live unmanaged machines within a selected portion of the network that is associated with a range of identifiers that includes identifiers between the respective identifiers of the first managed machine and a respective neighbor of the first managed machine; and generating (608) a local report identifying one or more unmanaged machines that have been detected within the selected portion of the network.

For example, in some embodiments, as illustrated in FIGS. 2A and 3A, or FIGS. 2A and 3C, a managed machine (e.g., a respective one of managed machine 212, 214, 216 and 218) responds to a detection instruction in detection request 222 by scanning a selected portion of the network (e.g., a respective one or two of local portions 228, 230, 232, 234, and 234), and generates a respective local report (e.g., a respective one of "Rpt_1", "Rpt_2", "Rpt_3", and "Rpt_4") identifying unmanaged machines detected within the selected portion of the network.

In another example, as illustrated in FIGS. 2B and 3B, or FIGS. 2B and 3D, a managed machine (e.g., a respective one of managed machine 212, 214, 216 and 218) responds to a detection instruction in detection request 224 by scanning a selected portion of the network (e.g., a respective one or two of local portions 228, 230, 232, 234, and 234), and generates a respective local report (e.g., a respective one of "Rpt_1", "Rpt_2", "Rpt_3", and "Rpt_4") identifying unmanaged machines detected within the selected portion of the network.

In some embodiments, each live unmanaged machine includes (610) a machine that responds to one or more predefined inquiries with one or more responses indicating that the machine is live and indicating that the machine is not a managed machine. In some embodiments, each network optionally has its own definition for an unmanaged machine based on the security requirements of that network. In some embodiments, each live unmanaged machine is configured to respond to a standard set of inquiries from a managed machine, and the managed machine is configured to ascertain the live and unmanaged status of the live unmanaged machine based on the response.

In some embodiments, the plurality of managed machines have self-assembled (612) into the linear communication orbit in accordance with a sequential order of respective identifiers (e.g., increasing IP address values or decreasing IP address values) that have been assigned to the plurality of managed machines.

In some embodiments, the first managed machine receives (614) the detection instruction from a respective upstream neighbor of the first managed machine, where the detection instruction has propagated from a source machine to the first managed machine through the linear communication orbit in a downstream direction. For example, as shown in FIG. 2A, head node 212 receives detection request 222 from its respective upstream neighbor (e.g., server 220); intermediate node 214 receives detection request 222 from its respective upstream neighbor (e.g., head node 212); intermediate node 216 receives detection request 222 from its respective upstream neighbor (e.g., intermediate node 214); and tail node 218 receives detection request 222 from its respective upstream neighbor (e.g., intermediate node 216).

In some embodiments, in response to receiving the detection instruction from the respective upstream neighbor of the first managed machine, the first managed machine forwards (616) the detection instruction to a respective downstream neighbor of the first managed machine in the linear communication orbit.

In some embodiments, the detection instruction is injected into the linear communication orbit at the head node or another node preceding the first managed machine; and the first machine receives the detection instruction from its upstream neighbor and forwards the detection instruction downstream along the linear communication orbit. In some embodiments, the detection instruction is injected by a server (e.g., server 220), as illustrated in FIG. 2A. In some embodiments, the detection instruction is injected by a managed machine preceding the first managed machine and propagates from the first machine to the tail node in the downstream direction.

In some embodiments, the first managed machine receives (618) the detection instruction from a respective downstream neighbor of the first managed machine, where the detection instruction has propagated from a source machine to the first managed machine through the linear communication orbit in an upstream direction. For example, when the detection instruction is injected into the orbit at the tail node or another node succeeding the first managed machine. The first managed machine receives the detection instruction from its downstream neighbor and forwards the detection instruction upstream along the linear orbit. For a first managed machine that is an intermediate node (e.g., intermediate node 214 in FIGS. 2B, 3B and 3D) or the head node (e.g., head node 212 in FIGS. 2B, 3B and 3D) in the orbit, the source machine is optionally the tail node or another node (e.g., intermediate node 216) from which the detection instruction has originated.

In some embodiments, in response to receiving the detection instruction from the respective downstream neighbor of the first managed machine, the first managed machine forwards (620) the detection instruction to a respective upstream neighbor of the first managed machine in the linear communication orbit. For example, when intermediate node 214 receives the detection instruction in detection request 224 from its respective downstream neighbor (e.g., intermediate node 216), intermediate node 214 forwards detection request 224 to its respective upstream neighbor (e.g., head node 212), as shown in FIGS. 3B and 3D.

In some embodiments, the first managed machine determines (622) that a predetermined criterion for initiating a scan for unmanaged assets has been triggered, and generates (624) the detection instruction in accordance with said determination. For example, in some embodiments, the detection instruction is automatically generated in a particular managed machine based on predetermined criteria (e.g., periodically, or when a new software update is available, etc.). This particular managed machine then sends the detection instruction along the linear communication orbit to other managed machines. In some embodiments, the particular managed machine is a head node, and the head node automatically generates the detection instruction and sends it to its respective downstream neighbor. In some embodiments, the particular managed machine is the tail node, and the tail node sends the automatically generated detection instruction to its respective upstream neighbor. In some embodiments, the particular managed machine is an intermediate machine (e.g., intermediate node 216 in FIGS. 2B, 3B, and 3D) in the linear communication orbit. The intermediate machine automatically generates the detection instruction based on one or more predetermined trigger conditions, and forwards (626) the detection instruction to the respective upstream and downstream neighbors of the first managed machine in the linear communication orbit.

In some embodiments, the first managed machine receives (628) an input from a user of the first managed machine, wherein the input requests a scan for unmanaged assets currently present in the network, and the first managed machine generates (630) the detection instruction in accordance with the input. This first managed machine then sends the detection instruction along the linear communication orbit to other managed machines. In some embodiments, the user provides the input at the head node of the linear communication orbit, and the head node generates the detection instruction and sends it to its respective downstream neighbor. In some embodiments, the user provides the input at the tail node of the linear communication orbit, and the tail node generates the detection instruction and sends it to its respective upstream neighbor. In some embodiments, the user provides the input at an intermediate machine (e.g., intermediate node 216 in FIGS. 2B, 3B, and 3D) of the linear communication orbit. The intermediate machine generates the detection instruction and forwards (632) the detection instruction to the respective upstream and downstream neighbors of the first managed machine in the linear communication orbit.

In some embodiments, regardless of how and where the detection instruction is generated in the linear communication orbit, when a managed machine receives the detection instruction, the managed machine forwards (636) the detection instruction to a next machine in the linear communication orbit along a predetermined direction. In some embodiments, the predetermined direction is (638) a downstream direction along the linear communication orbit. In some embodiments, the predetermined direction is (640) an upstream direction along the linear communication orbit. The direction of propagation for the detection instruction is illustrated in the exemplary scenarios shown in FIGS. 2A-2B and accompanying descriptions, in accordance with some embodiments.

In some embodiments, for the first managed machine, the forwarding of the detection instruction is performed before or during the scanning of the selected portion of the network. For example, in some embodiments, the first managed machine forwards the detection instruction immediately after receipt of the detection instruction, and before the first managed machine initiates the scan of its respective local neighborhood. In some embodiments, the first managed machine forwards the detection instruction as soon as possible (e.g., as soon as the first managed machine detects its next machine in the linear communication orbit), regardless of whether the first managed machine has completed the scan of its respective local neighborhood.

In some embodiments, the identifiers used in the network are (642) IP addresses assigned to machines present in the network. In some embodiments, other unique addresses or identifiers having a deterministic sequential order are optionally assigned to the machines in the network, and used as the identifiers for establishing the linear communication orbit.

In some embodiments, at expiration of a predetermined time window since generation of the detection instruction, the first managed machine generates (644) a reporting instruction for reporting the unmanaged asset that has been detected in the network. In some embodiments, the first managed machine sends (646) the reporting instruction to a next machine in the linear communication orbit along a predetermined direction. For example, if the first managed machine (e.g., machine 216 in FIG. 4B) is a machine that has generated the detection instruction (e.g., through automatic triggering, or in response to user input), the first machine also generates and sends out a reporting instruction after a predetermined time window (e.g., 30 seconds, or 2 minutes) to its neighbor machine(s) in the linear communication orbit. Some embodiments of this are illustrated in FIG. 4B and accompany descriptions.

In some embodiments, for a first managed machine that is not the machine that had generated the detection instruction and the reporting instruction, the first managed machine receives (648) the reporting instruction for reporting the unmanaged asset that has been detected in the network. In some embodiments, in response to receiving the reporting instruction (650): the first managed machine incorporates (652) the local report into an aggregated report included in the reporting instruction; and after the incorporating, forwards (654) the reporting instruction to a next machine in the linear communication orbit along a predetermined direction. Some embodiments of this are illustrated in FIG. 4A and accompanying descriptions. For example, as shown in FIG. 4A, the first managed machine (e.g., head node 212, intermediate node 214 or 216) receives the reporting instruction 238 from its upstream neighbor, incorporates its local report into the reporting instruction 238, and forwards the reporting instruction 238 to the next machine in the downstream direction. In some embodiments, when the predetermined direction is the downstream direction along the linear communication orbit and the last machine along the predetermined direction is the tail node, the tail node sends the aggregated report back to the machine that had generated the reporting instruction (e.g., server 220 shown in FIG. 4A).

In some embodiments, the predetermined direction is the upstream direction along the linear communication orbit and the last machine along the predetermined direction is the head node, the head node sends the aggregated report back to the machine that had generated the reporting instruction.

In some embodiments, for a first managed machine that is not the machine that had generated the detection instruction and the reporting instruction, the first managed machine receives (656) a remedial instruction, the remedial instruction specifying respective remedial instructions for live unmanaged machines that have been detected within the network. In some embodiments, in response to receiving the remedial instruction (658): the first managed machine determines (660) whether the remedial instruction specifies a respective remedial operation applicable to one or more live unmanaged machines that have been detected within the selected portion of the network; and if so, requests (662) the one or more live unmanaged machines to execute the respective remedial operation specified by the remedial instruction. Embodiments of this are illustrated in FIGS. 5A and 5B and accompanying descriptions.

In some embodiments, the first managed machine optionally forwards (664) the remedial instruction to a next machine in the linear communication orbit along a predetermined direction. Embodiments of this are illustrated in FIGS. 5A and 5B and accompanying descriptions. In some embodiments, the source machine that had generated the detection instruction and the reporting instruction (e.g., the server) optionally sends a respective remedial instruction to each managed machine that has detected at least one unmanaged asset, thus, each managed machine does not need to forward the received remedial instruction to other managed machines in the linear communication orbit.

In some embodiments, for a first managed machine that has generated the detection instruction and the reporting instruction, the first managed machine obtains (666) an aggregated report of unmanaged assets currently present in the network. In some embodiments, in response to obtaining the aggregated report, the first managed machine generates (668) a remedial instruction, the remedial instruction specifying respective remedial operations for live unmanaged machines that have been detected within the network; and forwards (670) the remedial instruction to a next machine in the linear communication orbit along a predetermined direction. In some embodiments, if the first managed machine is the head node, it sends the remedial instruction in the downstream direction. In some embodiments, if the first managed machine is the tail node, it sends the remedial instruction in the upstream direction. In some embodiments, if the first managed machine is an intermediate node, it sends the remedial instruction in either direction in which unmanaged assets have been detected.

In some embodiments, for a first managed machine that has generated the detection instruction and the reporting instruction, the first managed machine obtains (672) an aggregated report of unmanaged assets currently present in the network. In some embodiments, in response to obtaining the aggregated report, the first managed machine generates (674) a remedial instruction to a security system, where the security system performs respective remedial operations for live unmanaged machines that have been detected within the network. For example, in some embodiments, depending on how vulnerable the unmanaged assets are to external attacks based on the results of the original scan, the machine that had initiated the detection request may decide to quarantine some unmanaged assets immediately through an external server. For example, the scanning may have revealed that some assets are not only unmanaged, but also have serious vulnerabilities (e.g., missing a firewall, or critical patches, etc.); in which case, the remedial action may be to prohibit the asset from communicating with anyone on the network. Some embodiments of this are illustrated in FIGS. 5C-5D and accompanying descriptions.

In some embodiments, generating the remedial instruction includes (676) identifying the respective remedial operations suitable for the detected live unmanaged machines based on a multi-tier quarantine policy, wherein the multi-tier quarantine policy specifies different remedial operations for different types of unmanaged assets, and/or tiered access privileges, such as limited access to a subset of corporate services. For example, for some types of unmanaged assets, a simple registration is requested; for some types of unmanaged assets, installation of software patches are required; for some types of unmanaged assets, temporary quarantine is required; for some types of unmanaged assets, permanent quarantine is required; and for some types of unmanaged assets, removal from the network is performed. In some embodiments, for all unmanaged assets, the first order of business is to install management software. Once the management software is in place, the machines are ready to respond to respective remediation actions so they can be brought to a standard security configuration.

In some embodiments, scanning for live unmanaged machines within the selected portion of the network further includes (678): pinging (680) a respective network address associated with each identifier within the range of identifiers; in response to a respective echo received from each live machine within the selected portion of the network, determining (682) whether said live machine is an unmanaged machine; and in response to determining that said live machine is an unmanaged machine, adding the respective identifier of said live machine to the local report. Some embodiments of this are illustrated in FIGS. 3E and 3F and accompanying descriptions.

In some embodiments, the local report includes (684) information specific to each of the one or more unmanaged machines detected in the selected portion of the network. In some embodiments, the information includes (686) at least one or more of: a MAC address, an IP address, a computer name, an operation system name, and a hardware vendor name.

The flow charts shown in FIGS. 6A-6F are merely illustrative of some exemplary embodiments of fast detection and subsequent control of unmanaged assets in a managed network. Not all steps described in FIGS. 6A-6F are necessary in particular embodiments. Unless explicitly stated, in particular embodiments, the order of at least some steps may be different from those set forth in the flow charts. In addition, different sets of steps described in FIGS. 6A-6F may be selectively executed depending on the particular role that a particular managed machine (e.g., referred to as the first managed machine) is currently serving in the linear communication orbit, and may depend on a particular scenario that is occurring relative to the particular managed machine in the network. Other details of fast detection and subsequent control of unmanaged assets in a network are provided with respect to FIGS. 1A-5D.

FIG. 7A is a block diagram of an exemplary machine 102 shown in FIG. 1A. In some implementations, managed machine 102 includes one or more processors 702a, memory 704a for storing programs and instructions for execution by one or more processors 702a, one or more communications interfaces such as input/output interface 706a and network interface 708a, and one or more communications buses 710a for interconnecting these components.

In some embodiments, input/output interface 706a includes a display and input devices such as a keyboard, a mouse or a track-pad. In some embodiments, communication buses 710a include circuitry (sometimes called a chipset) that interconnects and controls communications between system components. In some embodiments, memory 704a includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 704a includes one or more storage devices remotely located from the one or more processors 702a. In some embodiments, memory 704a, or alternatively the non-volatile memory device(s) within memory 704a, comprises a non-transitory computer readable storage medium.

In some embodiments, memory 704a or alternatively the non-transitory computer readable storage medium of memory 704a stores the following programs, modules and data structures, instructions, or a subset thereof:
- Operating System 712a that includes procedures for handling various basic system services and for performing hardware dependent tasks.
- I/O module 714a that includes procedures for handling various basic input and output functions through one or more input and output devices.
- Communication module 716a that is used for connecting machine 102 to other machines (e.g., other machines 102 in network 100) or servers (e.g., server 108) via one or more network communication interfaces 708a (wired or wireless) and one or more communication networks, such as the Internet, other wide area networks, local area networks, metropolitan area networks, and so on.
- Orbit formation module 718a that includes instructions implementing a predetermined set of rules for creating, maintaining, and repairing the linear communication orbit for network and system management.
- Message and command module 720a that includes instructions for handling (1) receipt, processing, propagation, collection, and reporting of system, security and network management messages and commands (e.g., detection requests, reporting requests, reporting messages, remedial instructions, etc.), and/or (2) distribution of files and software updates (e.g., the management software).
- Neighboring node information 722 that includes information identifying neighboring managed machines of managed machine 102.
- Messages, reports and/or other data 724a (e.g., local or global reports) that is stored, temporarily or otherwise, upon receipt from a predecessor node, successor node or server, and/or that is locally generated, revised or supplemented by managed machine 102 prior to transmission to a predecessor node, successor node or server.

FIG. 7B is a block diagram of an exemplary server 108 shown in FIG. 1A. In some implementations, server 108 includes one or more processors 702b, memory 704b for storing programs and instructions for execution by the one or more processors 702b, one or more communications interfaces such as input/output interface 706b and network interface 708b, and one or more communications buses 710b for interconnecting these components.

In some embodiments, input/output interface 706b includes a display and input devices such as a keyboard, a mouse or a track-pad. In some embodiments, communication buses 710a include circuitry (sometimes called a chipset) that interconnects and controls communications between system components. In some embodiments, memory 704b includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 704b includes one or more storage devices remotely located from the one or more processors 702b. In some embodiments, memory 704b, or alternatively the non-volatile memory device(s) within memory 704b, comprises a non-transitory computer readable storage medium.

In some embodiments, memory 704b or alternatively the non-transitory computer readable storage medium of memory 704b stores the following programs, modules and data structures, instructions, or a subset thereof:
- Operating System 712b that includes procedures for handling various basic system services and for performing hardware dependent tasks.
- I/O module 714b that includes procedures for handling various basic input and output functions through one or more input and output devices.
- Communication module 716b that is used for connecting server 108 to managed machines 102 coupled to network 100 via one or more network communication interfaces 708b (wired or wireless) and one or more communication networks, such as the Internet, other wide area networks, local area networks, metropolitan area networks, and so on.
- Orbit formation module 718b that includes instructions to determine and provide ordinal positions of machines 102 in an ordered sequence of all managed machines 102 currently known to be coupled to network 100. In some embodiments, orbit formation module also stores a list of singletons, and head nodes and/or tail nodes of all linear communication orbits in the network.
- Message and command module 720b that includes instructions for (1) providing and collecting system, security and network management messages and commands (e.g., detection requests, reporting requests, reporting messages, remedial instructions, etc.) and/or (2) distribution of files and software updates (e.g., the management software). In some embodiments, message and command module 720b provides a user interface for a network or system administrator to directly perform various system and network functions, such as issuing status inquiries, providing management instructions, deploying system configurations, and dispatching software updates, etc.
- Network node information 726 that includes information identifying all managed machines known to be coupled to network 100.
- Head, tail and singleton node information 728, identifying head nodes, tail nodes and singleton nodes with established communication channels to and/or from server 108.

Messages, reports and/or other data 724b that is temporarily stored upon receipt from a head node, tail node, or other reporting node.

FIGS. 7A and 7B are merely illustrative of the structures of machines 102 and server 108. A person skilled in the art would recognize that particular embodiments of machines 102 and server 108 may include more or fewer components than those shown. One or more modules may be divided into sub-modules, and/or one or more functions may be provided by different modules than those shown.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A method of monitoring unmanaged assets in a network having a plurality of managed machines, comprising:
    at a first managed machine of the plurality of managed machines, wherein the plurality of managed machines are arranged in a linear communication orbit in accordance with a predefined order of respective machine identifiers of the plurality of managed machines, and each managed machine is coupled to at least one respective neighbor machine in the linear communication orbit by a corresponding local segment of the linear communication orbit:
        responding to a detection instruction for detecting unmanaged assets currently present in the network, by:
            scanning for live unmanaged machines within a first selected portion of the network that corresponds to a first range of machine identifiers that is between the respective machine identifiers of a respective upstream neighbor of the first managed machine and a respective downstream neighbor of the first managed machine in the linear communication orbit; and
            generating a local report identifying one or more unmanaged machines that have been detected within the first selected portion of the network.

2. The method of claim 1, wherein each live unmanaged machine comprises a machine that responds to one or more predefined inquiries with one or more responses indicating that the machine is live and indicating that the machine is not a managed machine.

3. The method of claim 1, wherein the plurality of managed machines have self-assembled into the linear communication orbit in accordance with the predefined order of respective machine identifiers that have been assigned to the plurality of managed machines.

4. The method of claim 1, further comprising:
    receiving the detection instruction from the respective upstream neighbor of the first managed machine, wherein the detection instruction has propagated from a source machine to the first managed machine through the linear communication orbit in a downstream direction.

5. The method of claim 4, further comprising:
    in response to receiving the detection instruction from the respective upstream neighbor of the first managed machine, forwarding the detection instruction to the respective downstream neighbor of the first managed machine in the linear communication orbit.

6. The method of claim 1, further comprising:
    determining that a predetermined criterion for initiating a scan for unmanaged assets has been triggered; and
    generating the detection instruction in accordance with said determination.

7. The method of claim 1, further comprising:
    at expiration of a predetermined time window since generation of the detection instruction, generating a reporting instruction for reporting the unmanaged asset that has been detected in the network; and
    sending the reporting instruction to a next machine in the linear communication orbit along a predetermined direction.

8. The method of claim 1, further comprising:
    receiving a reporting instruction for reporting the unmanaged asset that has been detected in the network; and
    in response to receiving the reporting instruction:
        incorporating the local report into an aggregated report included in the reporting instruction; and
        after the incorporating, forwarding the reporting instruction to a next machine in the linear communication orbit along a predetermined direction.

9. The method of claim 1, further comprising:
    receiving a remedial instruction, the remedial instruction specifying respective remedial instructions for live unmanaged machines that have been detected within the network;
    in response to receiving the remedial instruction:
        determining whether the remedial instruction specifies a respective remedial operation applicable to one or more live unmanaged machines that have been detected within the first selected portion of the network; and
        requesting the one or more live unmanaged machines to execute the respective remedial operation specified by the remedial instruction; and
    forwarding the remedial instruction to a next machine in the linear communication orbit along a predetermined direction.

10. The method of claim 1, further comprising:
    obtaining an aggregated report of unmanaged assets currently present in the network;
    in response to obtaining the aggregated report, generating a remedial instruction, the remedial instruction specifying respective remedial operations for live unmanaged machines that have been detected within the network; and
    forwarding the remedial instruction to a next machine in the linear communication orbit along a predetermined direction.

11. A system for monitoring unmanaged assets in a network having a plurality of managed machines, comprising:
    one or more processors; and
    memory having instructions stored thereon, the instructions, when executed by the one or more processors, cause the processors to perform operations comprising:
        at a first managed machine of the plurality of managed machines, wherein the plurality of managed machines are arranged in a linear communication orbit in accordance with a predefined order of respective machine identifiers of the plurality of managed machines, and each managed machine is coupled to at least one respective neighbor machine in the linear communication orbit by a corresponding local segment of the linear communication orbit:
responding to a detection instruction for detecting unmanaged assets currently present in the network, by:
scanning for live unmanaged machines within a first selected portion of the network that corresponds to a first range of machine identifiers that is between the respective machine identifiers of a respective upstream neighbor of the first managed machine and a respective downstream neighbor of the first managed machine in the linear communication orbit; and
generating a local report identifying one or more unmanaged machines that have been detected within the first selected portion of the network.

12. The system of claim 11, wherein each live unmanaged machine comprises a machine that responds to one or more predefined inquiries with one or more responses indicating that the machine is live and indicating that the machine is not a managed machine.

13. The system of claim 11, wherein the plurality of managed machines have self-assembled into the linear communication orbit in accordance with the predefined order of respective machine identifiers that have been assigned to the plurality of managed machines.

14. The system of claim 11, wherein the operations further comprise:
receiving the detection instruction from the respective upstream neighbor of the first managed machine, wherein the detection instruction has propagated from a source machine to the first managed machine through the linear communication orbit in a downstream direction.

15. The system of claim 14, wherein the operations further comprise:
in response to receiving the detection instruction from the respective upstream neighbor of the first managed machine, forwarding the detection instruction to the respective downstream neighbor of the first managed machine in the linear communication orbit.

16. The system of claim 11, wherein the operations further comprise:
determining that a predetermined criterion for initiating a scan for unmanaged assets has been triggered; and
generating the detection instruction in accordance with said determination.

17. The system of claim 11, wherein the operations further comprise:
at expiration of a predetermined time window since generation of the detection instruction, generating a reporting instruction for reporting the unmanaged asset that has been detected in the network; and
sending the reporting instruction to a next machine in the linear communication orbit along a predetermined direction.

18. The system of claim 11, wherein the operations further comprise:
receiving a reporting instruction for reporting the unmanaged asset that has been detected in the network; and
in response to receiving the reporting instruction:
incorporating the local report into an aggregated report included in the reporting instruction; and
after the incorporating, forwarding the reporting instruction to a next machine in the linear communication orbit along a predetermined direction.

19. The system of claim 11, wherein the operations further comprise:
receiving a remedial instruction, the remedial instruction specifying respective remedial instructions for live unmanaged machines that have been detected within the network;
in response to receiving the remedial instruction:
determining whether the remedial instruction specifies a respective remedial operation applicable to one or more live unmanaged machines that have been detected within the first selected portion of the network; and
requesting the one or more live unmanaged machines to execute the respective remedial operation specified by the remedial instruction; and
forwarding the remedial instruction to a next machine in the linear communication orbit along a predetermined direction.

20. The system of claim 11, wherein the operations further comprise:
obtaining an aggregated report of unmanaged assets currently present in the network;
in response to obtaining the aggregated report, generating a remedial instruction, the remedial instruction specifying respective remedial operations for live unmanaged machines that have been detected within the network; and
forwarding the remedial instruction to a next machine in the linear communication orbit along a predetermined direction.

21. A non-transitory computer-readable medium for monitoring unmanaged assets in a network having a plurality of managed machines, the computer-readable medium having instructions stored thereon, the instructions, when executed by one or more processors, cause the processors to perform operations comprising:
at a first managed machine of the plurality of managed machines, wherein the plurality of managed machines are arranged in a linear communication orbit in accordance with a predefined order of respective machine identifiers of the plurality of managed machines, and each managed machine is coupled to at least one respective neighbor machine in the linear communication orbit by a corresponding local segment of the linear communication orbit:
responding to a detection instruction for detecting unmanaged assets currently present in the network, by:
scanning for live unmanaged machines within a first selected portion of the network that corresponds to a first range of machine identifiers that is between the respective machine identifiers of a respective upstream neighbor of the first managed machine and a respective downstream neighbor of the first managed machine in the linear communication orbit; and
generating a local report identifying one or more unmanaged machines that have been detected within the first selected portion of the network.

22. The computer-readable medium of claim 21, wherein each live unmanaged machine comprises a machine that responds to one or more predefined inquiries with one or more responses indicating that the machine is live and indicating that the machine is not a managed machine.

23. The computer-readable medium of claim 21, wherein the plurality of managed machines have self-assembled into the linear communication orbit in accordance with the predefined order of respective machine identifiers that have been assigned to the plurality of managed machines.

24. The computer-readable medium of claim 21, wherein the operations further comprise:
receiving the detection instruction from the respective upstream neighbor of the first managed machine, wherein the detection instruction has propagated from a source machine to the first managed machine through the linear communication orbit in a downstream direction.

25. The computer-readable medium of claim 24, wherein the operations further comprise:
in response to receiving the detection instruction from the respective upstream neighbor of the first managed machine, forwarding the detection instruction to the respective downstream neighbor of the first managed machine in the linear communication orbit.

26. The computer-readable medium of claim 21, wherein the operations further comprise:
determining that a predetermined criterion for initiating a scan for unmanaged assets has been triggered; and
generating the detection instruction in accordance with said determination.

27. The computer-readable medium of claim 21, wherein the operations further comprise:
at expiration of a predetermined time window since generation of the detection instruction, generating a reporting instruction for reporting the unmanaged asset that has been detected in the network; and
sending the reporting instruction to a next machine in the linear communication orbit along a predetermined direction.

28. The computer-readable medium of claim 21, wherein the operations further comprise:
receiving a reporting instruction for reporting the unmanaged asset that has been detected in the network; and
in response to receiving the reporting instruction:
incorporating the local report into an aggregated report included in the reporting instruction; and
after the incorporating, forwarding the reporting instruction to a next machine in the linear communication orbit along a predetermined direction.

29. The computer-readable medium of claim 21, wherein the operations further comprise:
receiving a remedial instruction, the remedial instruction specifying respective remedial instructions for live unmanaged machines that have been detected within the network;
in response to receiving the remedial instruction:
determining whether the remedial instruction specifies a respective remedial operation applicable to one or more live unmanaged machines that have been detected within the first selected portion of the network; and
requesting the one or more live unmanaged machines to execute the respective remedial operation specified by the remedial instruction; and
forwarding the remedial instruction to a next machine in the linear communication orbit along a predetermined direction.

30. The computer-readable medium of claim 21, wherein the operations further comprise:
obtaining an aggregated report of unmanaged assets currently present in the network;
in response to obtaining the aggregated report, generating a remedial instruction, the remedial instruction specifying respective remedial operations for live unmanaged machines that have been detected within the network; and
forwarding the remedial instruction to a next machine in the linear communication orbit along a predetermined direction.

* * * * *